US008880002B2

(12) United States Patent
Falck et al.

(10) Patent No.: US 8,880,002 B2
(45) Date of Patent: Nov. 4, 2014

(54) OVER-THE-AIR TEST

(75) Inventors: Marko Falck, Sarajärvi (FI); Pekka Kyösti, Jokirinne (FI); Petteri Heino, Oulu (FI); Jukka-Pekka Nuutinen, Martinniemi (FI); Jouni Saastamoinen, Coppell, TX (US)

(73) Assignee: Elektrobit System Test Oy, Oulu (FI)

( * ) Notice: Subject to any disclaimer, the term of this patent is extended or adjusted under 35 U.S.C. 154(b) by 199 days.

(21) Appl. No.: 13/262,974

(22) PCT Filed: Jun. 3, 2009

(86) PCT No.: PCT/FI2009/050471
§ 371 (c)(1),
(2), (4) Date: Dec. 7, 2011

(87) PCT Pub. No.: WO2010/139840
PCT Pub. Date: Dec. 9, 2010

(65) Prior Publication Data
US 2012/0071107 A1    Mar. 22, 2012

(51) Int. Cl.
*H04B 17/00* (2006.01)
(52) U.S. Cl.
USPC ............ 455/67.12; 455/67.11; 455/67.13; 455/423; 455/63.1; 455/115.2; 455/110; 455/304; 375/224; 375/268; 343/703; 343/893
(58) Field of Classification Search
USPC ............ 455/67.12, 67.11, 67.13, 67.14, 63.1, 455/423, 424, 101, 110, 115.1, 115.2, 455/226.1, 304; 375/224, 267, 268; 343/703
See application file for complete search history.

(56) References Cited

U.S. PATENT DOCUMENTS

| | | | | |
|---|---|---|---|---|
| 6,901,062 | B2 * | 5/2005 | Scherzer et al. | 370/335 |
| 7,035,594 | B2 * | 4/2006 | Wallace et al. | 455/67.12 |
| 7,430,413 | B2 * | 9/2008 | Fleury et al. | 455/423 |
| 7,554,508 | B2 * | 6/2009 | Johnson et al. | 343/893 |
| 7,965,986 | B2 * | 6/2011 | Foegelle | 455/67.11 |
| 8,331,869 | B2 * | 12/2012 | Foegelle | 455/67.12 |
| 8,526,939 | B2 * | 9/2013 | Harteneck | 455/423 |
| 2001/0031647 | A1 | 10/2001 | Scherzer et al. | |
| 2003/0003883 | A1 | 1/2003 | Wallace et al. | |
| 2006/0176993 | A1 * | 8/2006 | Kwun et al. | 375/367 |
| 2008/0056340 | A1 | 3/2008 | Foegelle | |
| 2008/0305754 | A1 | 12/2008 | Foegelle | |
| 2011/0189962 | A1 * | 8/2011 | Kyosti et al. | 455/67.11 |
| 2011/0299570 | A1 * | 12/2011 | Reed | 375/130 |

OTHER PUBLICATIONS

Rohde et al., "Cost-Effective Over-the-Air Performance Measurements on MIMO Devices" Internet, URL:http://ftp.3gpp.orgItsp_ranIWG4_RadioITSGR4_51/Documents/, Sections 2.1, 4.2; Figs. 1,2, pp. 1-5 (May 2009).
Ville Mottonen, International Search Report for corresponding PCT application, pp. 1-4 (Feb. 16, 2010).
Canadian Examination Report, Canadian Application No. 2,757,315, dated Oct. 10, 2013, 3 pages.

\* cited by examiner

*Primary Examiner* — Marceau Milord
(74) *Attorney, Agent, or Firm* — Hoffmann & Baron, LLP

(57) ABSTRACT

A simulated radio channel is shifted with respect to a plurality of antenna elements coupled with an emulator for communicating with a device under test by using different directions for the simulated radio channel in an anechoic chamber.

14 Claims, 18 Drawing Sheets

OVER-THE-AIR TEST

CROSS-REFERENCE TO RELATED APPLICATION

This application is a National Stage application of International Application No. PCT/FI2009/050471, filed Jun. 3, 2009, which is incorporated by reference herein in its entirety.

BACKGROUND

1. Field

The invention relates to an over-the-air testing of a device in an anechoic chamber.

2. Description of the Related Art

When a radio frequency signal is transmitted from a transmitter to a receiver, the signal propagates in a radio channel along one or more paths having different angles of arrivals, signal delays, polarizations and powers, which cause fadings of different durations and strengths in the received signal. In addition, noise and interference due to other transmitters interfere with the radio connection.

A transmitter and a receiver can be tested using a radio channel emulator emulating real circumstances. In a digital radio channel emulator, a channel is usually modeled with an FIR filter, which generates convolution between the channel model and an applied signal by weighting the signal, which is delayed by different delays, with channel coefficients, i.e. tap coefficients, and by summing the weighted signal components. The channel coefficients are functions of time to correspond to the temporal behavior of a real channel. A traditional radio channel emulation test is performed via a conducted connection such that a transmitter and a receiver are coupled together via a cable.

Communication between a subscriber terminal and a base station of a radio system can be tested using an OTA (Over The Air) test where a real subscriber terminal is surrounded by a plurality of antenna elements of an emulator in an anechoic chamber. The emulator may be coupled to or act as a base station emulating paths between the subscriber terminal and the base station according to a channel model.

The subscriber terminal may be mechanically rotated during the test in order to test the subscriber terminal when the communication takes place from several directions. However, rotation causes problems in cabling since cables between the subscriber terminal and the emulator cannot rotate too much. Additionally, the complexity of the testing system increases by the application of a rotation mechanism, such as a motor and a turning table driven by the motor, and its control. Hence, there is a need for a better OTA test solution.

SUMMARY

An object of the invention is to provide an improved solution.

According to an aspect of the invention, there is provided a method of communicating with an electronic device under test through a simulated radio channel of an emulator. The method is characterized by optimizing a cost function of a theoretical spatial cross correlation and a spatial correlation obtained with antenna elements for determining weights of the antenna elements; forming, on the basis of the weights, at least one beam of a simulated radio channel with at least two antenna elements; and shifting the simulated radio channel with respect to a plurality of antenna elements coupled with the emulator for communicating with the device under test by using different directions for the simulated radio channel in an anechoic chamber.

According to another aspect of the invention, there is provided a testing system of communicating with an electronic device under test through a simulated radio channel of an emulator. The testing system is configured to optimize a cost function of a theoretical spatial cross correlation and a spatial correlation obtained with antenna elements for determining weights of the antenna elements; form, on the basis of the weights, at least one beam of a simulated radio channel with at least two antenna elements; and shift the simulated radio channel with respect to the plurality of antenna elements coupled with the emulator for communicating with the device under test by using different directions for the simulated radio channel in an anechoic chamber.

According to another aspect of the invention, there is provided an emulator of communicating with an electronic device under test through a simulated radio channel. The emulator is configured to optimize a cost function of a theoretical spatial cross correlation and a spatial correlation obtained with antenna elements for determining weights of the antenna elements; form, on the basis of the weights, at least one beam of a simulated radio channel with at least two antenna elements; and shift the simulated radio channel with respect to the plurality of antenna elements coupled with the emulator for communicating with the device under test by using different directions for the simulated radio channel in an anechoic chamber.

The invention provides several advantages. The DUT may be tested from different directions without problems with cables or complexity by shifting the simulated radio channel electronically with respect to the DUT.

BRIEF DESCRIPTION OF THE DRAWINGS

In the following, the invention will be described in greater detail with reference to the embodiments and the accompanying drawings, in which.

DETAILED DESCRIPTION

Channel impulse responses and optimization of the antenna weights in OTA may be formed so that an accurate correlation, an angle of arrival and polarization properties are possible for a DUT. The described solution may use a transmitter, a multidimensional radio channel emulator, an anechoic chamber, antenna elements coupled with separate radio channels inside the anechoic chamber and a DUT in the anechoic chamber, for example. The simulated radio channel may be shifted with respect to the angle of arrival on the DUT such that the same power angular spectrum can be used in communication at different angles at different moments of time.

Figure 1:
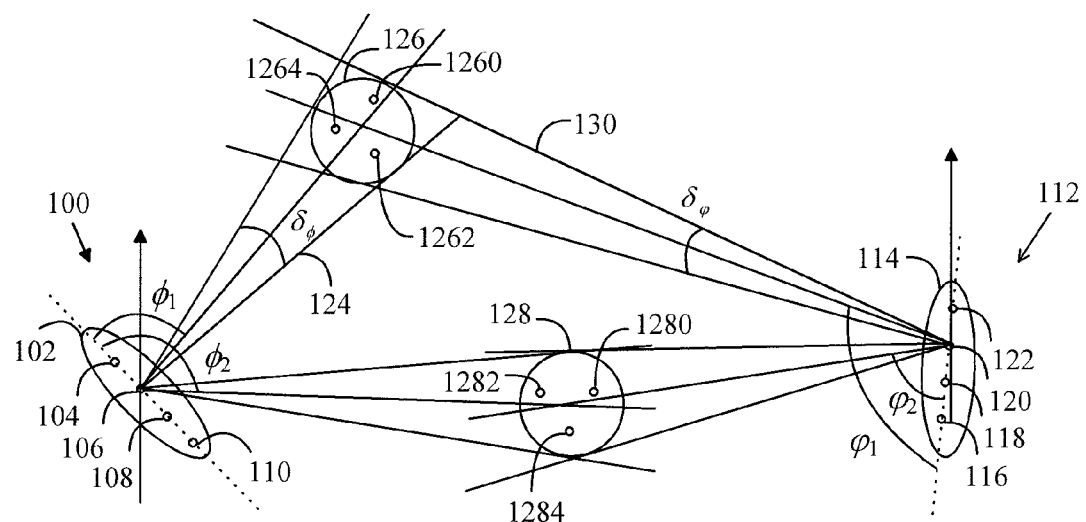
FIG. 1 illustrates propagation of a radio signal.

FIG. 1 illustrates propagation of a radio signal between a transmitter and a receiver. The transmitter 100 may comprise an antenna 102 of at least one antenna element 104 to 110. The antenna may be, for example, ULA (Uniform Linear Array) antenna where the spacing between the antenna elements is constant, for example half the wavelength of the radio signal. In this example, the transmitter 100 may be a base station of a radio system. Correspondingly, the receiver 112 may comprise an antenna 114 of at least one antenna element 116 to 122. In this example, the receiver 112 may be a subscriber terminal of a radio system. When the transmitter 100 transmits a radio signal, a transmission beam 124 may be directed to an angle $\phi_1$ and its angle spread may be $\delta_\phi$ which may be $x\delta_\phi^{std}$, where x is a real number larger than zero and $\delta_\phi^{std}$ is the standard deviation of the angle $\phi_1$. The transmission beam 124 may hit at least one cluster 126, 128 which reflects and/or scatters the radiation. Each cluster 126, 128 may have a number of active regions 1260 to 1264, 1280 to 1284 which predominantly reflect/scatter in the cluster 126, 128. A cluster 126, 128 may be fixed or moving, and the cluster 126, 128 may be a natural or man-made object, such as a building, a train, a mountain etc. The active regions may be some finer structural features on an object.

The reflected and/or scattered beam may be directed towards the antenna 114 of the receiver 112. The antenna 114 may have a reception angle $\phi_1$ and its angle spread may be $\delta_\phi$ which may be $y\delta_\phi^{std}$, where y is a real number larger than zero and $\delta_\phi^{std}$ is the standard deviation of angle $\phi_1$. The beam 130 reflected and/or scattered from the cluster 126 may then be received. Similarly, the antenna 114 may also have a beam from a reception angle $\phi_2$ and its angle spread may be $\delta_{\phi 2}$. The propagation from the transmitter 100 to the receiver 112 via at least one cluster 126, 128 causes an additional delay to a signal with respect to a signal traveling straight along a line of sight.

The clusters 126, 128 in a radio channel are responsible for multi-path propagation. It can be approximated that a path and a cluster 126, 128 have a correspondence such that one received path comes from one cluster. Hence, a radio channel may be described by cluster powers, delays, nominal AoA (Angle of Arrival) and AoD (Angle of Departure), and angle spreads of clusters at both arrival and departure ends. Additionally, information on the transmitter antenna arrays is required. The information may include values of parameters of antenna array geometry and an antenna field pattern (beam). Also the subscriber terminal velocity vector and/or the cluster Doppler frequency component may be needed.

Table 1 presents an example of a clustered delay line model of a radio channel in an urban environment. Clusters 1 and 3 have three active regions which have different delays and powers.

TABLE 1

Non-line-of-sight clustered delay line model, urban macro-cell.

| Cluster # | Delay [ns] | | | Power [dB] | | | AoD [°] | AoA [°] |
|---|---|---|---|---|---|---|---|---|
| 1 | 0 | 5 | 10 | −3.5 | −5.7 | −7.5 | 6 | 29 |
| 2 | 5 | | | −9.2 | | | 44 | −98 |
| 3 | 20 | 25 | 30 | −3.0 | −5.2 | −7.0 | 2 | 8 |
| 4 | 45 | | | −7.8 | | | −34 | −114 |
| 5 | 265 | | | −3.7 | | | 26 | 70 |
| 6 | 290 | | | −8.6 | | | −41 | 107 |
| 7 | 325 | | | −2.5 | | | −17 | 59 |
| 8 | 340 | | | −7.3 | | | −33 | −103 |
| 9 | 355 | | | −3.8 | | | 24 | 73 |
| 10 | 440 | | | −6.9 | | | −34 | −111 |
| 11 | 555 | | | −8.9 | | | −38 | −112 |
| 12 | 645 | | | −9.0 | | | 44 | 122 |
| 13 | 970 | | | −9.8 | | | 53 | 129 |
| 14 | 1015 | | | −15.0 | | | 54 | 153 |
| 15 | 1220 | | | −13.4 | | | 53 | −145 |
| 16 | 1395 | | | −14.9 | | | 52 | −157 |
| 17 | 1540 | | | −16.7 | | | 57 | −178 |
| 18 | 1750 | | | −11.2 | | | 53 | −114 |
| 19 | 1870 | | | −18.2 | | | −54 | −160 |
| 20 | 1885 | | | −17.8 | | | −60 | −175 |

An ASD (Angle Spread of Departure) may be assumed constant for all clusters, ASD=2° in this example. Correspondingly, an ASA (Angle Spread of Arrival) may be assumed constant for all clusters, having ASA=15° in this example. Additionally, XPR (Cross Polarization Power ratio) may also be assumed constant for all clusters having XPR=7 dB in this example. They may also be different for different clusters.

An impulse response estimate $H_{u,s,n}(t, \tau)$ of a radio channel may be expressed in a mathematical form as follows:

$$H_{u,s,n}(t, \tau) = \sqrt{(P_n)} \sum_{m=1}^{M} \begin{pmatrix} F_{tx,s}(\phi_{n,m}) \exp(jd_s k \sin(\phi_{n,m})). \\ F_{rx,u}(\phi_{n,m}) \exp(jd_u k \sin(\phi_{n,m})). \\ \exp(j(\Phi_{n,m} + 2\pi\upsilon_{n,m} t) \delta(\tau - \tau_{n,m})) \end{pmatrix}, \quad (1)$$

where $F_{tx,s}$ is a transmission antenna field pattern, $F_{rx,u}$ is a reception antenna field pattern, $d_s$ is the distance between two successive antenna elements in a ULA transmission antenna, $d_u$ is the distance between the antenna elements in a ULA reception antenna, k is a wave number ($k=2\pi/\lambda_0$, where $\lambda_0$ is the wavelength of the radio signal), $P_n$ means a cluster power, M means the number of active regions in a cluster, m is an index of an active region, n is an index of a cluster, $\Phi_{n,m}$ is a constant phase term of a scatterer n,m, $\upsilon_{n,m}$ is a Doppler frequency of an active region having index n,m and $\tau$ is a delay.

A Doppler frequency of an active region having index n,m can be expressed as:

$$\upsilon_{n,m} = \frac{\|\bar{v}\|\cos(\varphi_{n,m} - \theta_v)}{\lambda_0}, \quad (2)$$

where $\bar{v}$ is a velocity vector and $\|\bar{v}\|$ is the relative speed between an active region and the receiver.

The impulse response estimate in equation (1) may be simplified, when the receiver antenna is assumed omnidirectional, in the following form $$H_{s,n}(t,\tau) = \sqrt{(P_n)} \sum_{m=1}^{M} \begin{pmatrix} F_{tx,s}(\phi_{n,m})\exp(jd_s k \sin(\phi_{n,m})). \\ \exp(j(\Phi_{n,m} + 2\pi\upsilon_{n,m}t))\delta(\tau - \tau_{n,m})) \end{pmatrix} \quad (3)$$

The impulse response estimate can also be called a radio channel estimate and it is a model according to which the radio channel distorts a signal propagating therein. Channel models like SCM (Spatial Channel Model), SCME (SCM Extended), WINNER (Wireless World Initiative New Radio) and IMT-Advanced (International Mobile Telecommunications) are geometrical models comprising bi-directional clusters. Power azimuth spectra on the transmitter and receiver ends are like in the example FIGS. 2 and 3. Although the generation of channel coefficients is performed by summing rays (discrete directions) in eq. (1), clusters may be defined by the parameters described above. In other words, specular scatterers are not an essential part of the model, but they are just tools to generate channel coefficients.

The fading, including Doppler and possible base station antenna correlation as well as the channel power delay profile, is included in the channel coefficients.

Only the DUT antenna correlation and other DUT antenna effects are left out to real radio transmission in the OTA chamber.

$$H_{s,n}(t,\tau) = \sqrt{P_n} \sum_{m=1}^{M} \begin{pmatrix} F_{tx,s}(\phi_{n,m})\exp(jd_s k \sin(\phi_{n,m})). \\ \exp(j(\Phi + 2\pi\upsilon_{n,m}t))\delta(\tau - \tau_{n,m}) \end{pmatrix} \quad (4)$$

Doppler frequencies $\upsilon_{n,m}$ may be determined based on AoA angles. The result is a discrete impulse response with vector coefficients $H_n(t,\tau)$. Dimensions of $H_n(t,\tau)$ are 1×S, where S is the number of base station antennas.

Mapping of the clusters n may be performed to proper emulator channels and OTA antennas, depending on the cluster nominal direction and the cluster angle spread.

An approximation of cluster arrival angle spread by two OTA antennas may be a source of inaccuracy. That may be true especially in the case of sparse OTA antenna layout and narrow clusters, i.e. $\Delta\theta$>>AoA angle spread. The cluster angle spread values at the DUT end are, for example, in SCM=35°, WINNER 3° to 22°, IMT-Advanced 3° to 22°, and TGn 14° to 55°, depending on the modelled scenario.

It may be necessary to split a single cluster to at least two OTA antennas in order to generate decorrelation between possible DUT antennas. If the signal is transmitted only from a single OTA antenna, the case is equal to specular reflection with no angle spread and full correlation at the DUT.

Figure 2:
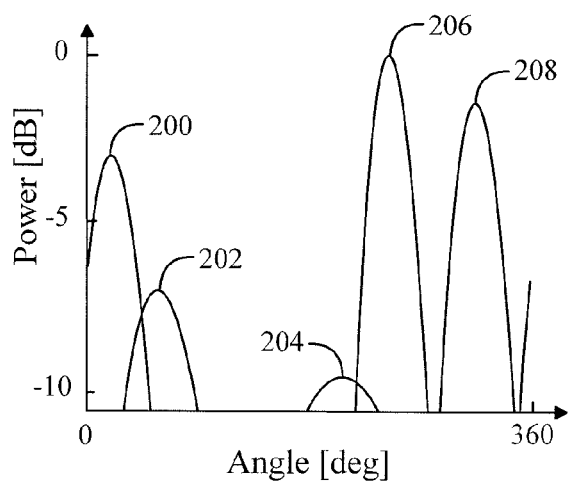
FIG. 2 illustrates a power azimuth spectrum of reception beams.

FIG. 2 illustrates a power azimuth spectrum of reception beams from five clusters. In FIG. 2 the x-axis is the angle in degrees and the y-axis is the power in decibels. The five beams 200, 202, 204, 206 and 208 are received at different angles of arrival. The beams 200, 202, 204, 206 and 208 may be received at different moments of time i.e. at least one of them may have a different delay with respect to the other beams.

Figure 3:
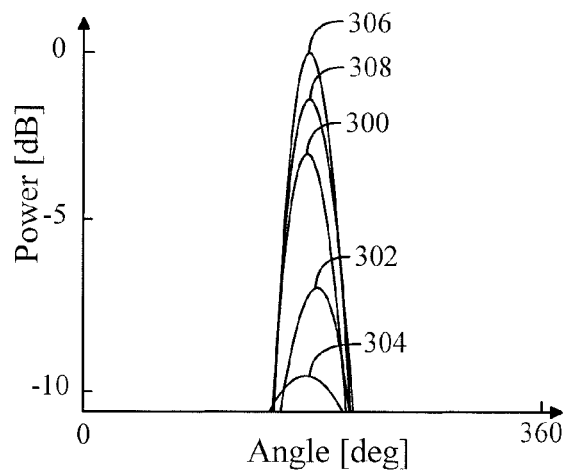
FIG. 3 illustrates a power azimuth spectrum of transmission beams.

FIG. 3 shows a power azimuth spectrum of transmission beams to the same five clusters according to the example in FIG. 2. In FIG. 3, the x-axis is the angle in degrees and the y-axis is the power in decibels. The five beams 300, 302, 304, 306 and 308 are transmitted at only slightly different angles of departure since the reflecting and/or scattering clusters are only slightly dispersed in the angle.

Figure 4:
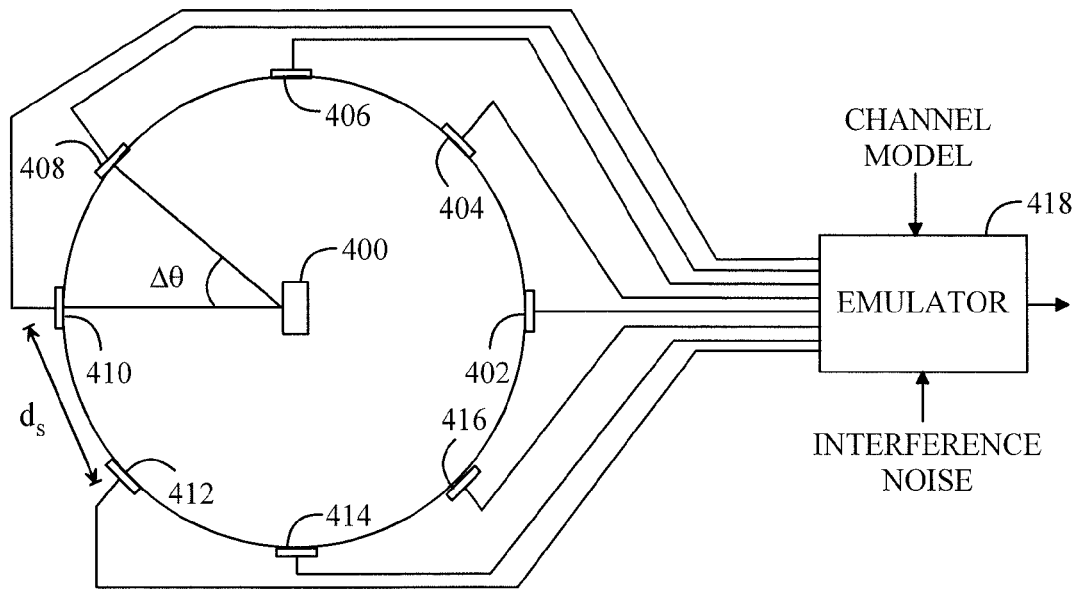
FIG. 4 shows a measurement configuration in an OTA test chamber.

FIG. 4 presents an OTA test chamber. A DUT 400 is in the centre and chamber antenna elements 402, 404, 406, 408, 410, 412, 414 and 416 are in a circle around the DUT 400 with a uniform spacing (e.g. 45° with 8 elements). Let us denote the directions of K OTA antennas with $\theta_k$, k=1, ..., K and the spacing of an antenna in the angle domain with $\Delta\theta$. The angle $\Delta\theta$ expresses a measure of the separation of two antenna elements 402 to 416 with respect to the electronic device 400. Each of the antenna elements is connected to a single emulator output port. If a single antenna element is considered, the emulator configuration is 1×8 SIMO, with two antenna elements 2×8 MIMO etc.

MS (DUT) antenna characteristics are assumed unknown. In other words, this information may not be used in the OTA modelling.

The test chamber may be an anechoic room. A DUT 400, such as a subscriber terminal, may be surrounded by antenna elements 402, 404, 406, 408, 410, 412, 414 and 416, which are coupled to an emulator 418, which may be, for example, EB (Elektrobit) Propsim® C8. The emulator 418 may comprise a processor, a memory and a suitable computer program. In this example, there are eight antenna elements in a circle separated by a constant angle of 45°. In general, there may be at least two antenna elements 402 to 416 and they may be separated from each other by a separation angle $\Delta\theta$. When there are at least three antenna elements 402 to 416, the separation angle $\Delta\theta$ may be the same or different for any two successive antenna elements 402 to 416. The antenna elements 402 to 416 may be at the same or different distances from the DUT 400 and the antenna elements 402 to 416 may be placed only in a sector instead of being placed at a full angle or a full solid angle. The DUT 400 may also have one or more elements in the antenna.

Communicating with the DUT 400 over the air enables testing an antenna design, polarization and placement effects in such a way that path directions may be freely included in the testing. That is not possible if a cable connection is used between the emulator 418 and the DUT 400.

The emulator 418 has a channel model for the test. The channel model may be selected by a person accomplishing the test. Additionally, interference and noise may be input to the test in a desirable manner and to a desirable extent. The channel model used may be a play back model based on a recorded channel from a real radio system or it may be an artificially generated model or it may a combination of a play back model and an artificially generated model.

Assume now that the emulator 418 is coupled to or acts as a base station of a radio system and the antenna elements 402 to 416 are transmitting to the DUT 400, which acts as the receiving subscriber terminal of the radio system. It may be assumed that DUT antenna characteristics are unknown and that information may be ignored in the following example. The OTA antenna elements 402 to 416 may be assumed to be at angles $\theta_k$ of directions from the DUT, where k is $1, \ldots, K$, where K is the number of antenna elements. The angular spacing of the antenna elements 402 to 416 may be constant $\theta_{k+1} - \theta_k = \Delta\theta$.

A geometric channel model in the emulator 418 may be mapped on the OTA antenna elements 402 to 416. The emulator 418 simulates the situation where the transmitted radiation from the base station hits clusters. The emulator 418 also forms a reflected and/or scattered beam from each cluster and divides the departure power and delay of the cluster suitably to the at least one antenna element 402 to 416. Hence, the antenna elements 402 to 416 are controlled to reproduce reflected and/or scattered beams of clusters.

Often the angle of a beam representing a reflected and/or scattered beam from a cluster differs from the angle $\theta_k$ of the antenna element 402 to 416 more than a threshold, which may be for example 1°. Then such a beam may be transmitted using at least two antenna elements 402 to 416.

In an embodiment, the power of a simulated cluster may be divided between two antenna elements on the basis of antenna angles $\theta_k$ and a cluster angle $\phi_n$. The angle $\theta_k$ of an antenna element k closest to the cluster angle $\phi_n$ may be found according to the following mathematical equation $$\theta_k = \Delta\theta \, \text{int}\left(\frac{\min_j\left(\theta_j + \frac{1}{2}\Delta\theta - \varphi_n\right)}{\Delta\theta}\right), \quad (5)$$

where min means the minimum value of the expression among all values of $\theta_j$, int means an integer value of the division (including 0). The value of k is $$\text{int}\left(\frac{\min_j\left(\theta_j + \frac{1}{2}\Delta\theta - \varphi_n\right)}{\Delta\theta}\right).$$

The second antenna element k+1 may then be the one having an angle $\theta_k + \Delta\theta = \theta_{k+1}$. Hence, the selected antenna elements may be those between which the beam reflected and/or scattered from a cluster at least mainly is directed towards the DUT 400.

A selection of the OTA antennas for a cluster n can be done by selecting the two closest values of $\theta_k$ to AoA nominal angle $\phi_n$. The power of cluster n is divided between the two OTA antennas depending on angular distance between $\theta_k$ and $\phi_n$. If e.g. $\phi_n$ is exactly on the middle between $\theta_k$ and $\theta_{k+1}$ the power is divided such that it is 50% for each.

A weight $w_{n,k}$ for each antenna element 402 to 416 may be calculated in the following manner $$w_{n,k} = 1 - \frac{|\theta_{k+i} - \varphi_n|}{\Delta\theta}, \quad (6)$$

where i is either 1 or 2, k is the index of an antenna element closest to the angle $\phi_n$ of a cluster n. The power $P_n$ of the cluster n to an antenna element k is multiplied by a weight $w_{n,k}$ such that $P_k + P_{k+1} = P_n$.

Figure 10:
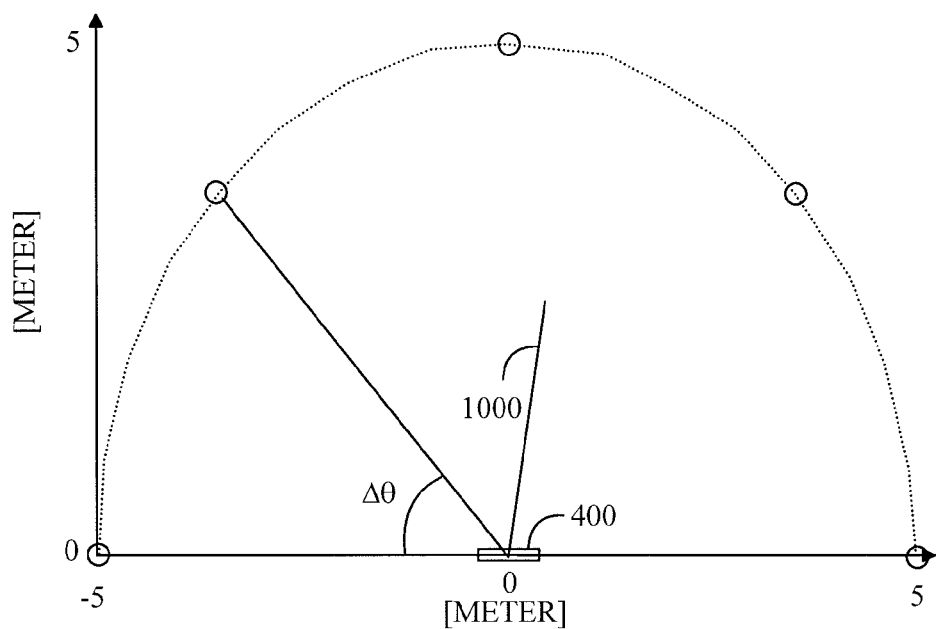
FIG. 10 presents an AoA in an OTA chamber.

FIG. 10 presents an AoA in an OTA chamber. A line 1000 is an AoA vector and circles are OTA antenna elements around the DUT 400.

Figure 11:
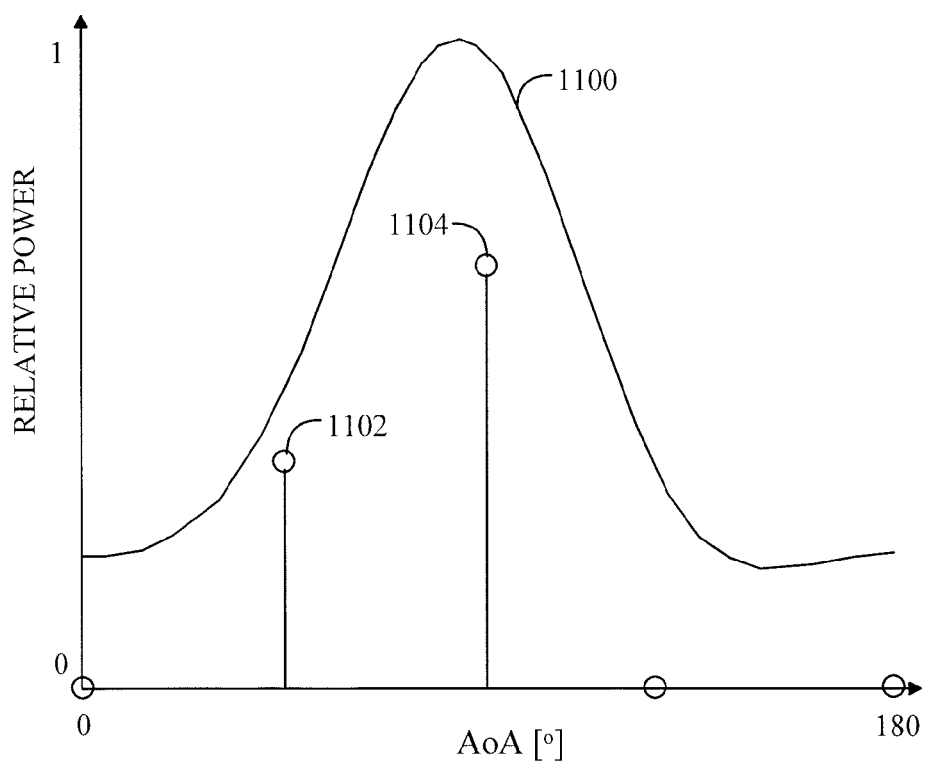
FIG. 11 presents antenna weighting of the antenna elements of FIG. 10.

FIG. 11 presents antenna weighting of the antenna elements of FIG. 10. A curve 1100 depicts a beam of the antenna elements seen by a receiver. Two weights 1102, 1104 of the antenna elements are non-zero while the rest are zero.

Assume now 8 antenna elements in a circle around a DUT, i.e. K=8 and $\Delta\theta$=45°, a single base station antenna, a single cluster, cluster power 2, AoA $\phi_n$=37°. A power $P_k$ for antenna element 402 (antenna k) becomes $$P_k = P_n w_{n1} = P_n\left(1 - \frac{|0° - 37°|}{45°}\right) = 2.0$$

$$0.1778 = 0.3556$$

and a power $P_{k+1}$ for antenna element 404 (antenna k+1) becomes $$P_{k+1} = P_n w_{n2} = P_n\left(1 - \frac{|45° - 37°|}{45°}\right) = 2.0$$

$$0.8222 = 1.6444$$

Figure 5:
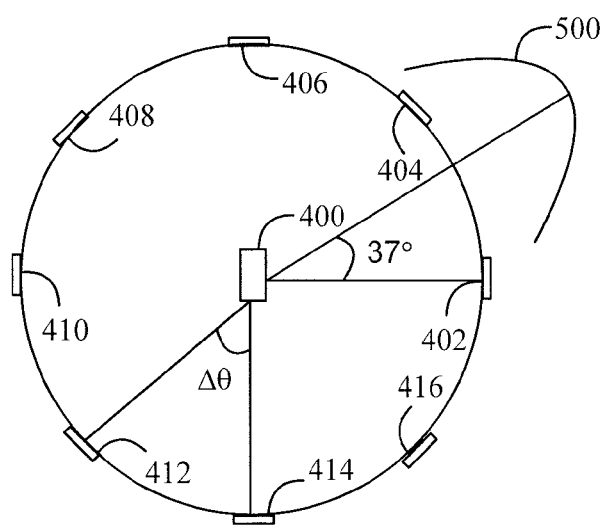
FIG. 5 shows a beam to be modeled by the antenna elements.

FIG. 5 illustrates the beam 500 formed by the antenna elements 402, 404 with the calculated power division. The signals fed to different antenna elements may also be phase shifted with respect to each other such that a directional power spectrum may be modified. The phase shifting may be performed by weighting the base band signals with suitable complex coefficients which set powers and relative delays of the signals. The phase shifting may also be performed by delaying the radio frequency signals with respect to each other. For example, desired delays may be selected suitably from a bank of digital delays (for example digital finite impulse response filter structure). Different beams of different paths of the simulated radio channel may be formed at different moments of time. A beam of a path of the simulated radio channel may be formed at different moments of time. A plurality of different beams of different paths of the simulated radio channel may be formed at a moment of time.

Figure 6:
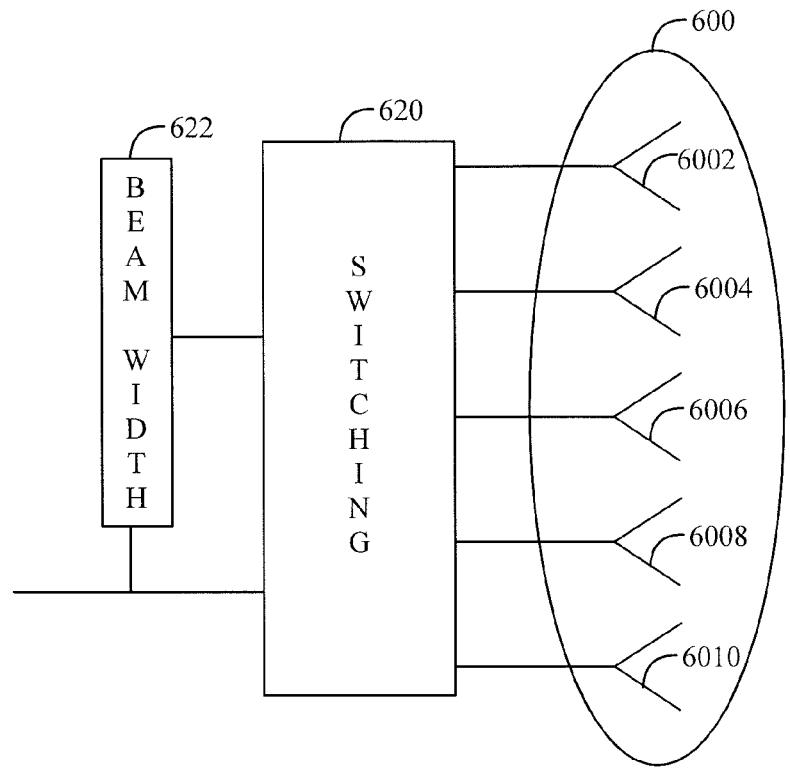
FIG. 6 shows a group of antenna elements and an associated antenna group switching network.

FIG. 6 presents a group 600 of antenna elements. In an embodiment, the antenna may comprise at least one group 600 of antenna elements 6002, 6004, 6006, 6008, 6010. Hence, in place of the antenna element 402, for example, there may not only be one antenna element but several elements 6002, 6004, 6006, 6008, 6010. Each antenna element 402 to 416 may comprise, for example, five elements. In general, in place of an antenna element 402 to 416 there may be a group 600 of at least two antenna elements 6002, 6004, 6006, 6008, 6010.

A mapping to OTA antenna elements may be simpler and more accurate if a single OTA antenna element is replaced by a group 600 of antenna elements 6002, 6004, 6006, 6008, 6010. Assume that a group comprises N antenna elements 6002, 6004, 6006, 6008, 6010.

The number of elements 6002, 6004, 6006, 6008, 6010 to be fed in each antenna group 600 may be selected on the basis of a channel model arrival (per cluster) azimuth spread. Each group may be fed by a single emulator output port, and antenna elements 6002, 6004, 6006, 6008, 6010 of each group may be connected to the emulator with a switching network 620 which may comprise at least one splitter, combiner, attenuator and/or phase shifter. In an embodiment, the switching (i.e. selection of antenna elements) may be similar for all groups and it may to be done only once per measurement.

On the basis of the signal from the emulator a beam controller 622 may control how many antenna elements of a group are needed for a beam. In general, any positive integer number of antenna elements up to the maximum may be used.

In an embodiment, an odd number of elements may be used. For example, with N=5 choices may be one, three or five elements, depending on the scenario of the channel model. If there are narrow clusters in the channel model, three elements may be enough for the beam. If the clusters are wider, the maximum number of elements may be used for the beam.

The selection of antenna elements in a group may be expressed in a mathematical form as follows:

$$Z' = \min_{Z}\left(\text{round}\left(\frac{\delta_\varphi}{\Delta\theta/N}\right) \leq Z\right), \quad (7)$$

where Z=N−2j and j is 0, . . . , (N−3)/2, round means rounding to a closest integer value of the division (the minimum value is 1).

A mapping of the channel model to an OTA antenna may be performed by applying the following rules. Set each of the clusters to appropriate emulator channels and OTA antenna elements, depending on the nominal direction of a cluster. Selection of the OTA antenna elements for a cluster n may be made by taking the closest OTA antenna group centre $\theta_k$ for a nominal AoA $\phi_n$ of a cluster. Select the number of antenna elements, for example Z', within a group by a switch 622.

Figure 7:
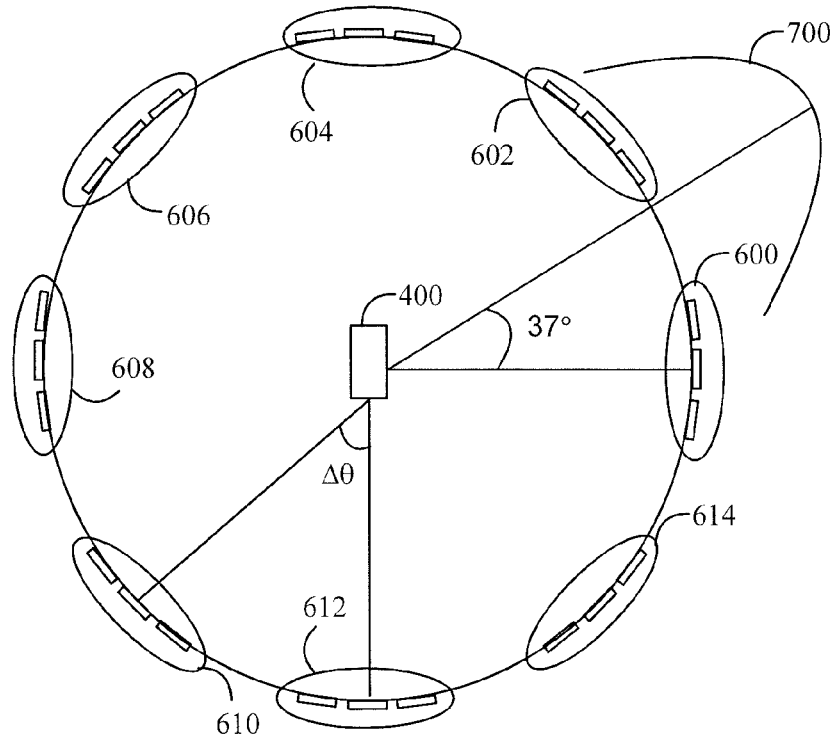
FIG. 7 shows a DUT surrounded by groups of antenna elements.

FIG. 7 presents a DUT 400 surrounded by groups 600 to 614 of antenna elements. In this example, each group 600 to 614 has three antenna elements. A beam 700 may be formed using a group 602. With eight groups and five elements in each group a full circle may be covered with uniformly located antenna elements. If a cluster is extremely wide, requiring a very wide beam, for example wider than Δθ, the cluster may be mapped to more than one antenna group.

Several groups may also be used to form a beam. The groups may be applied in the same manner as what is described relating to equations (4) and (5) for selecting two antenna elements. Then, instead of selecting two antenna elements, two groups of antenna elements may be selected for a beam. In FIG. 7, a beam 700 may be formed using groups 600 and 602.

In an embodiment, fixed weights may be implemented for antenna elements such that, for example, a Gaussian or Laplacian shaped cluster power azimuth spectrum can be replicated.

Reception using at least two antenna elements is performed in a corresponding manner. Hence, the method may be applied in both uplink and downlink. Assume now that the antenna elements 402 to 416 are receiving signals from the DUT 400. Signals received by the at least two antenna elements 402 to 416 may be combined in the emulator 418 for forming a reception beam of a signal of a path of a simulated radio channel. The combining may comprise weighting the power from the two antenna elements or group of antenna elements using weights $w_{nk+1}$ calculated in equations (4) and (5). Additionally, the shape and direction of the beam may be weighted using complex coefficients or another sort of phase shifting.

Figure 8:
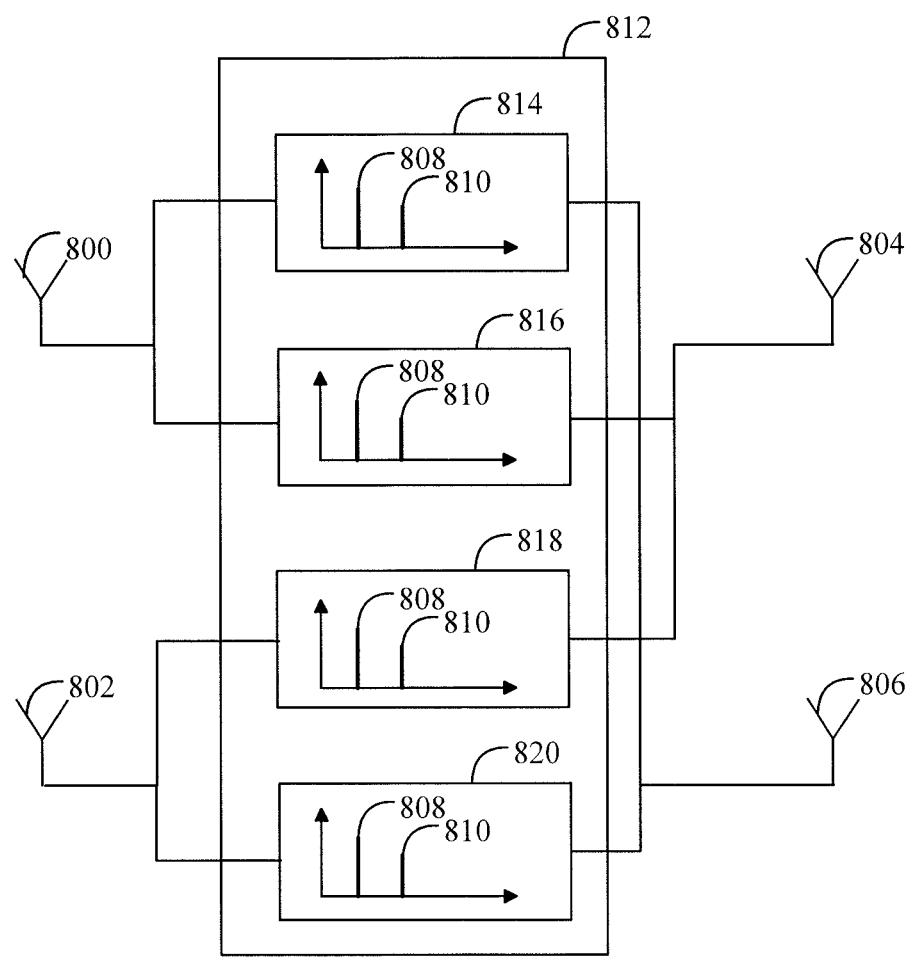
FIG. 8 presents controlling delays of antennas in a MIMO configuration.

The embodiments may be applied in 3GPP (Third Generation Partnership Project) LTE (Long Term Evolution), WiMAX (Worldwide Interoperability for Microwave Access), Wi-Fi and/or WCDMA (Wide-band Code Division Multiple Access). In the MIMO (Multiple In Multiple Out) which is also a possible application, signals are distributed to antenna elements in a different manner with respect to the present embodiments. FIG. 8 shows a MIMO configuration having two transmit antenna elements 800, 802 and two receive antenna elements 804, 806. There are two delay taps 808, 810 representing different paths in delay elements 814 to 820 of an emulator 812. Signals from each transmit antennas 800, 802 are fed to the delay elements 814 to 820 delaying the signals with the same delays (taps 808, 810). The outputs of the delay elements 814 and 820 which delay with both delays (taps 808, 810) are combined and fed to the antenna element 806. Correspondingly, the outputs of delay elements 816 and 818 which also delay with both delays (delay taps 808, 810) are combined and fed to the antenna element 804.

Figure 9:
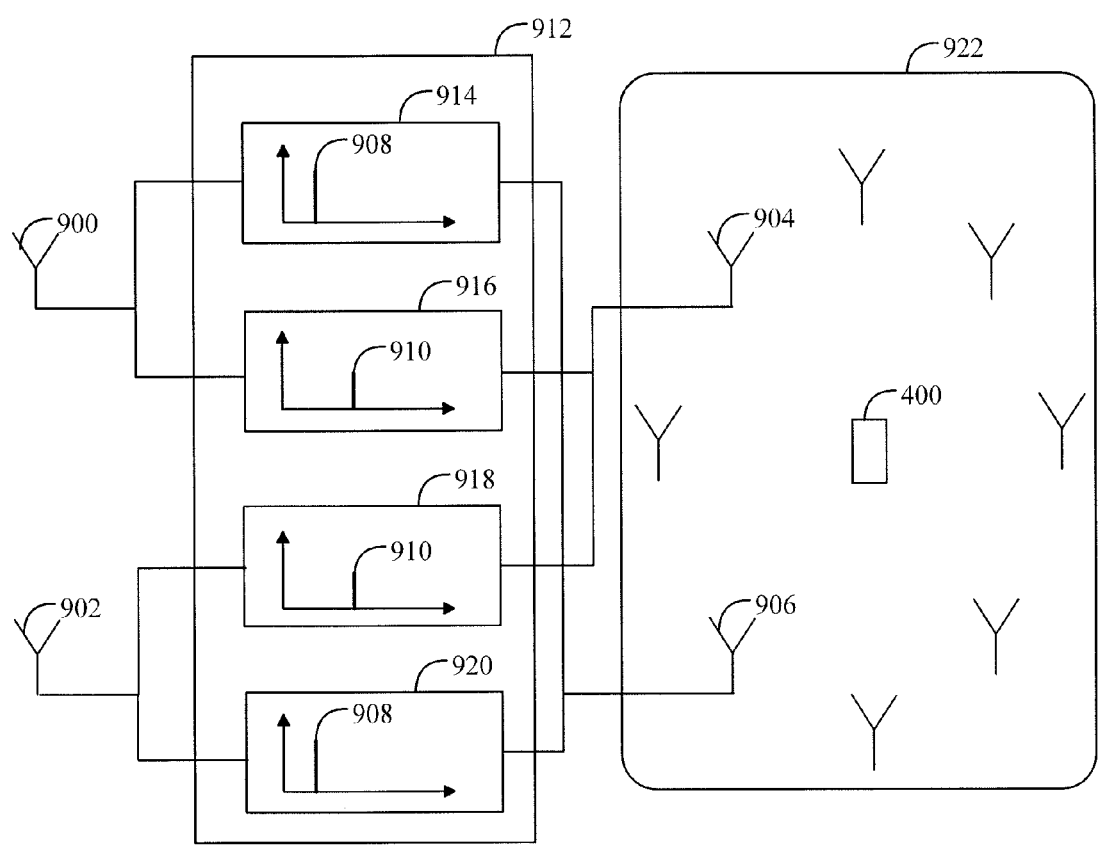
FIG. 9 presents controlling delays of antennas in an OTA chamber.

FIG. 9 shows an example of a present embodiment. Also in this example there are two transmit antenna elements 900, 902 and two receive antenna elements 904, 906 of a plurality of antenna elements in an anechoic chamber 922 of the OTA test. There are two delay taps 908, 910 representing different paths in delay elements 914 to 920 of an emulator 912. A signal from the transmit antenna 900 is fed to the delay elements 914, 916. The delay element 914 delays the signal with a delay corresponding to the delay tap 908 and the delay element 916 delays the signal with a delay corresponding to the delay tap 910.

A signal from the transmit antenna 902 is fed to the delay elements 918, 920. The delay element 918 delays the signal with a delay corresponding to the delay tap 910 and the delay element 920 delays the signal with a delay corresponding to the delay tap 908. The outputs of the delay elements 914 and 920 which delay with the same delay (delay tap 908) are combined and fed to the antenna element 906. Correspondingly, the outputs of delay the elements 916 and 918 which delay with the same delay (delay tap 910) are combined and fed to the antenna element 904. Hence, different delay taps are fed to different antenna elements 904, 906 if they represent a different AoA.

Creation of spatial effects inside an OTA chamber corresponds to the sum-of-sinusoids based channel modelling. A technique for parameter calculation for spatio-temporal channel models, called $L^p$-norm method, may be refined for OTA channel modelling. For an accurate spatial correlation modelling, a cost function such as an $L^2$-norm $E_\rho(g_1, g_2, \ldots, g_K)$ may be optimized $$E_\rho(g_1, g_2, \ldots, g_k) = \sqrt{\frac{1}{M}\sum_{m=1}^{M}|\rho(\Delta_m, \varphi_0, \sigma_\varphi) - \tilde{\rho}(\Delta_m)|^2}, \quad (8)$$

where $\rho(\Delta_m, \phi_0, \sigma_\phi)$ is a theoretical spatial cross correlation on an antenna element spacing $\Delta_m$ of antenna elements, $\phi_0$ is a nominal AoA, $\sigma_\phi$ is an angular spread, and $\tilde{\rho}(\Delta_m)$ is a spatial cross correlation obtained with the real OTA antenna elements. The term $\Delta_m$, in turn, can be defined as $d_s/\lambda_0$, where $d_s$ is the distance between antenna elements 402 to 416 in meters and $\lambda_0$ is the wavelength of the electromagnetic radiation of the radio signal. Instead of optimizing the $L_p$-norm some other norm may be used, and in general the optimizing may be based on some other cost function.

The purpose of the optimization is to determine weights w OTA antenna elements by minimizing the cost function above with respect to gain factors G or directly with respect to the weights w. Alternatively, the optimization may be performed by a gradient method, a half space method or the like.

In general, the cross correlation p can be expressed as a function of gain factors g:

$$f(g_1, g_2, \ldots, g_K) = \rho, \quad (9)$$

where f is a function. Correspondingly, the term G may be expressed as a function of cross correlation ρ:

$$G = (g_1, g_2, \ldots, g_K) = f^{-1}(\rho), \quad (10)$$

where $f^{-1}$ is an inverse function of f.

The theoretical cross correlation function $\rho(\Delta_m, \phi_0, \sigma_\phi)$ for Laplacian shaped PAS (Power Angular Spectrum) may be defined as $$\rho(\Delta_m, \varphi_0, \sigma_\varphi) = \int \exp(-j2\pi\Delta_m \sin(\varphi_0 + \varphi)) \frac{1}{\sqrt{2}\,\sigma_\varphi} \exp\left(\frac{\sqrt{2}\,|\varphi|}{\sigma_\varphi}\right) d\varphi \quad (11)$$

In practice, it can be calculated for truncated Laplacian PAS or by discrete approximation. The spatial correlation obtained with the OTA antenna elements may be defined as $$\tilde{\rho}(\Delta_m, \theta_0) = \left(\sum_{i=1}^{K'} g_{k_i}\right)^{-1} \sum_{k=1}^{K'} g_{k_i} \exp(-j2\pi\Delta_m \sin\theta_{k_i}) \quad (12)$$

The term K' represents the number of active antenna elements among the plurality of antenna elements in the OTA chamber. The active antenna elements form a desired beam. With a solution of eight OTA elements of spatial antenna it may be chosen K'=3, $\theta_k \in \{0°, 45°, 90°, 135°, 180°, 225°, 270°, 315°, 360°\}$ and $g_k$ may be limited such that $g_k \subset [0,1]$. A practical value for M may be about 50. The optimization can be performed numerically by applying a binary search in K' dimensional space, because eq. (8) is a convex function. With a binary search only about $\log_2 L^{K'} = K' \log_2 L$ iterations (i.e. computations of eq. (8)) are needed, where L is the number of points of $g_k \subset [0,1]$. If L=1000 and K'=3, for example, only 30 iterations are needed. With these parameters a brute force method would require $1000^3 = 10^9$ solutions for eq. (8).

The eq. (8) can be computed by applying (11) and (12) and using numerical optimization methods, such as a gradient method and a half space method.

In order to simplify the notation, let us denote the weights as a vector G $$G = (g_1, g_2, \ldots, g_K), \quad (13)$$

and the set of the phase terms as a vector $A_m$ $$A_m = (a_{m1} a_{m2}, \ldots, a_{mK'}) \quad (14)$$
$$= \begin{pmatrix} \exp(-j2\pi\Delta_m \sin\theta_1), \exp(-j2\pi\Delta_m \sin\theta_2), \ldots, \\ \exp(-j2\pi\Delta_m \sin\theta_{K'}) \end{pmatrix}$$

and the theoretical cross correlation as a scalar $\rho_m$ $$\rho_m = \rho(\Delta_m, \phi_0, \sigma_\phi). \quad (15)$$

Now $E_\rho$ may be minimized by solving zero of the gradient $$\nabla E_\rho(g_1, g_2, \ldots, g_K) = \quad (16)$$

$$\sum_{k=1}^{K'} 2u_k \sum_{m=1}^{M} \left| \rho_m - \frac{G \cdot A}{\sum_{k=1}^{K'} g_k} \left( \frac{a_{mk} \sum_{k=1}^{K'} g_k - (G \cdot A) K'}{\sum_{k=1}^{K'} g_k} \right) \right| = 0$$

where $u_k$ is the kth unit base vector. The gradient equation above can be processed to a set of K' equations, which may be solved with respect to weights $g_k$ $$\begin{cases} \sum_{m=1}^{M} \left| \rho_m - \frac{G \cdot A}{\sum_{k=1}^{K'} g_k} \left( \frac{a_{m1} \sum_{k=1}^{K'} g_k - (G \cdot A) K'}{\sum_{k=1}^{K'} g_k} \right) \right| = 0 \\ \vdots \\ \sum_{m=1}^{M} \left| \rho_m - \frac{G \cdot A}{\sum_{k=1}^{K'} g_k} \left( \frac{a_{mK'} \sum_{k=1}^{K'} g_k - (G \cdot A) K'}{\sum_{k=1}^{K'} g_k} \right) \right| = 0 \end{cases} \quad (17)$$

Equation (17) represents an analytical set of equations, i.e. making the gradient (16) zero.

For accurate correlation modelling an $L^2$-norm optimization with the following parameters may be used. At first, the closest K' antenna elements to the nominal arrival angle $\phi_0$ may be searched for by taking the first K' indices $k_i$ from the sequence $$|\exp(j\phi_0) - \exp(j\theta_{k_1})| < |\exp(j\phi_0) - \exp(j\theta_{k_2})| < \ldots < |\exp(j\phi_0) - \exp(j\theta_{k_{K'}})|$$

The antenna element $k_1$ is the closest to the nominal arrival angle $\phi_0$. For the second, the nominal arrival angle $\phi_0$ may be set to zero in equations (8) and (9) to form the spatial cross correlation $\tilde{\rho}(\Delta_m)$ $$\tilde{\rho}(\Delta_m) = \left(\sum_{i=1}^{K'} g_{k_i}\right)^{-1} \sum_{i=1}^{K'} g_{k_i} \exp(-j2\pi\Delta_m \sin(\theta_{k_i} - \theta_{k_1})) \quad (18)$$

In other words, for accurate correlation modelling the nominal arrival angle $\phi_0$ in eq. (8) and (11) may be rounded to the closest OTA antenna element direction $\theta_{k_i}$. Then K' active OTA antenna elements (an odd number of antennas) may be selected symmetrically around antenna $k_i$. As a rule of thumb, the number K' should be such that K'Δθ<180°. If e.g. K'=3 and Δθ=45°, antenna element angles $\theta_{k_i} = -45°$, $\theta_{k_i} = 0°$ and $\theta_{k_i} = 45°$ may be set for eq. (12). Now coefficients $\{g_{k-1}, g_k, g_{k+1}\}$ may be determined by minimizing formula (8). Other coefficients $g_k$ are equal to zero. For example, in FIG. 10 the antenna indices are 3, 2 and 4 and the corresponding directions $\theta_k$ are 90°, 45° and 135°.

Finally, a weight $w_{n,k}$ for a cluster n and correspondingly for an antenna element k may be written as $$w_{n,k} = \sqrt{g_k}, \quad (19)$$

where coefficients $g_k$ are determined separately for each cluster n.

Figure 12:
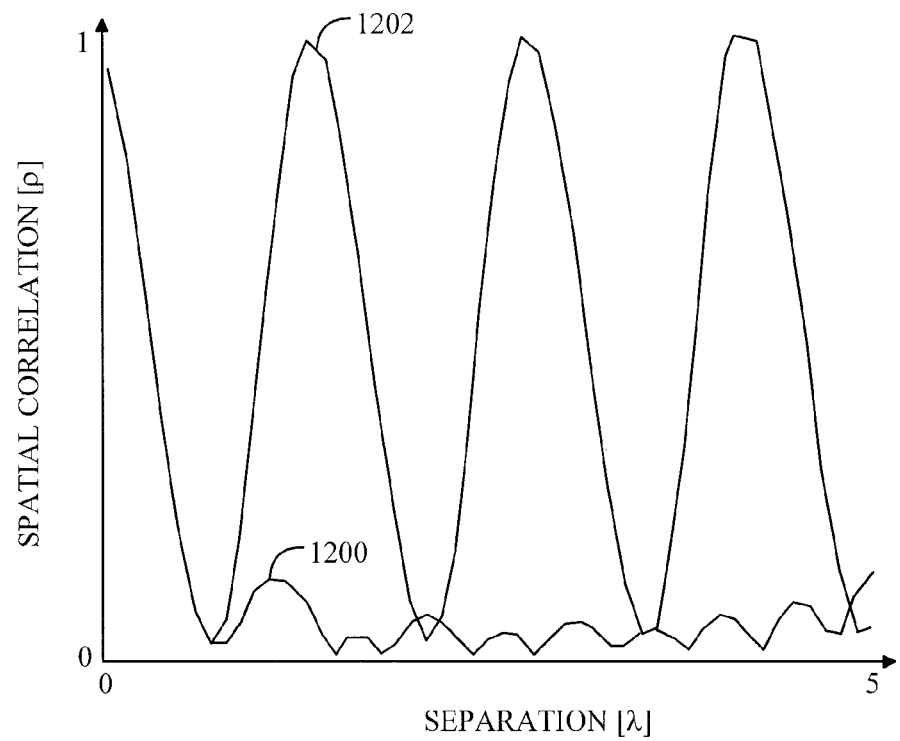
FIG. 12 presents spatial correlation with three antenna elements.

FIG. 12 presents an example of a theoretical spatial correlation 1200 of three antenna elements and an ideal spatial correlation 1202 of 35° Laplacian PAS having 8 OTA antenna elements with 45° spacing.

In an OTA chamber, the positions of antenna elements are fixed. When modelling arbitrary arrival angles (AoA), the directions between OTA antennas need to be interpolated. This can be done by minimizing the norm of eq. (6) by using the actual nominal arrival angles $\phi_0$ without any rounding. Otherwise, the procedure may be as described above.

Figure 13:
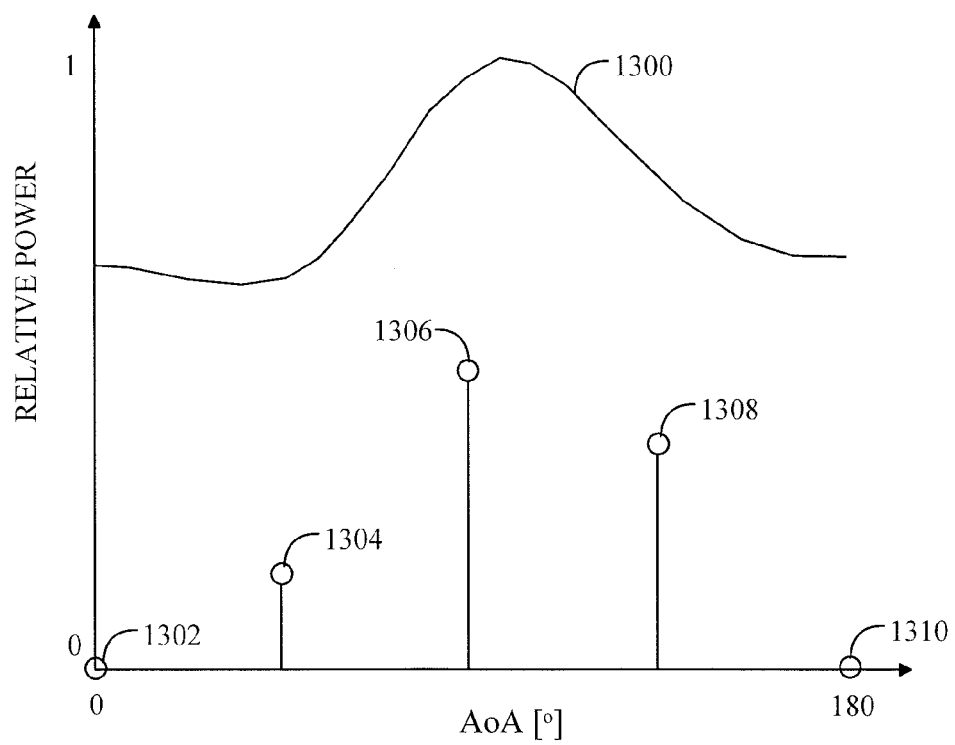
FIG. 13 presents weights of antenna elements and resulting PAS.
Figure 14:
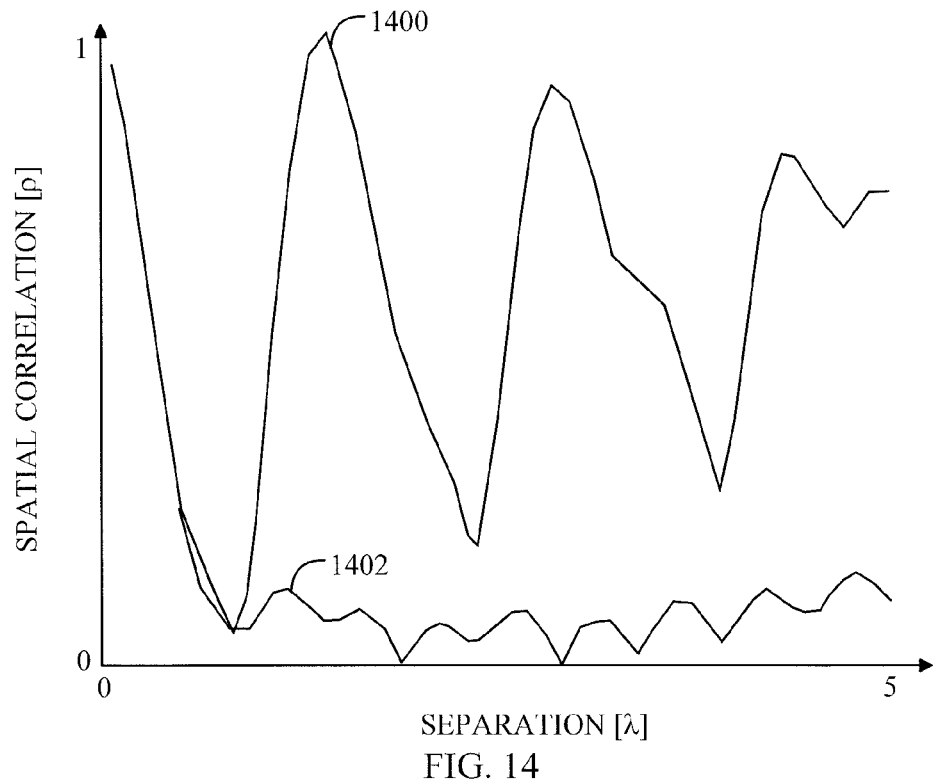
FIG. 14 presents a theoretical correlation and ideal spatial correlation.

In the example of FIGS. 13 and 14, weights of antenna elements were determined by a joint optimization. FIG. 13 presents weights 1302, 1304, 1306, 1308 and 1310 of antenna elements and resulting PAS 1300. FIG. 14 presents a theoretical spatial correlation 1400 of three antenna elements and ideal spatial correlation 1402. The example refers to a two-element ULA on Rx having 8 OTA antennas with 45° spacing, AoA=100°. The target AoA was 100° and the target cross correlation $\rho(\Delta_m, \phi_0, \sigma_\phi)$ with a 0.5 wavelength separation yields $|\rho|=0.2476$. A resulting correlation matrix Rrx_abs is given below and the resulting maximum on PAS in FIG. 13 is 101°.

$$\text{Rrx\_abs} = \begin{bmatrix} 1.0000 & 0.2404 \\ 0.2404 & 1.0000 \end{bmatrix}$$

Figure 15:
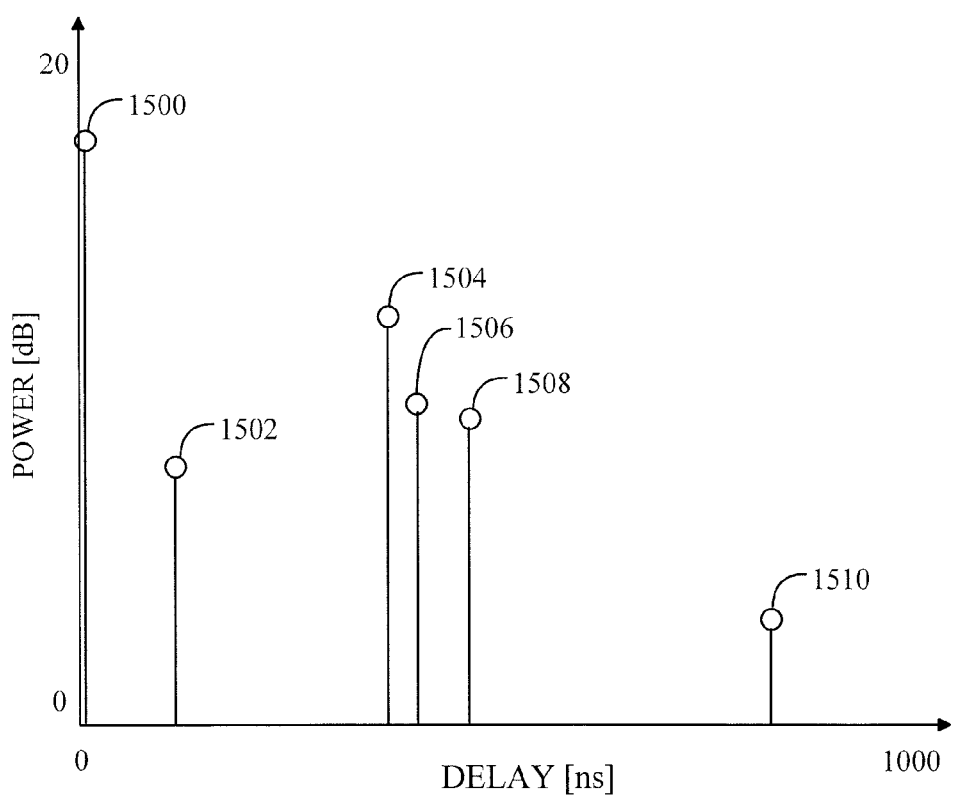
FIG. 15 presents a PDP of six clusters.
Figure 16:
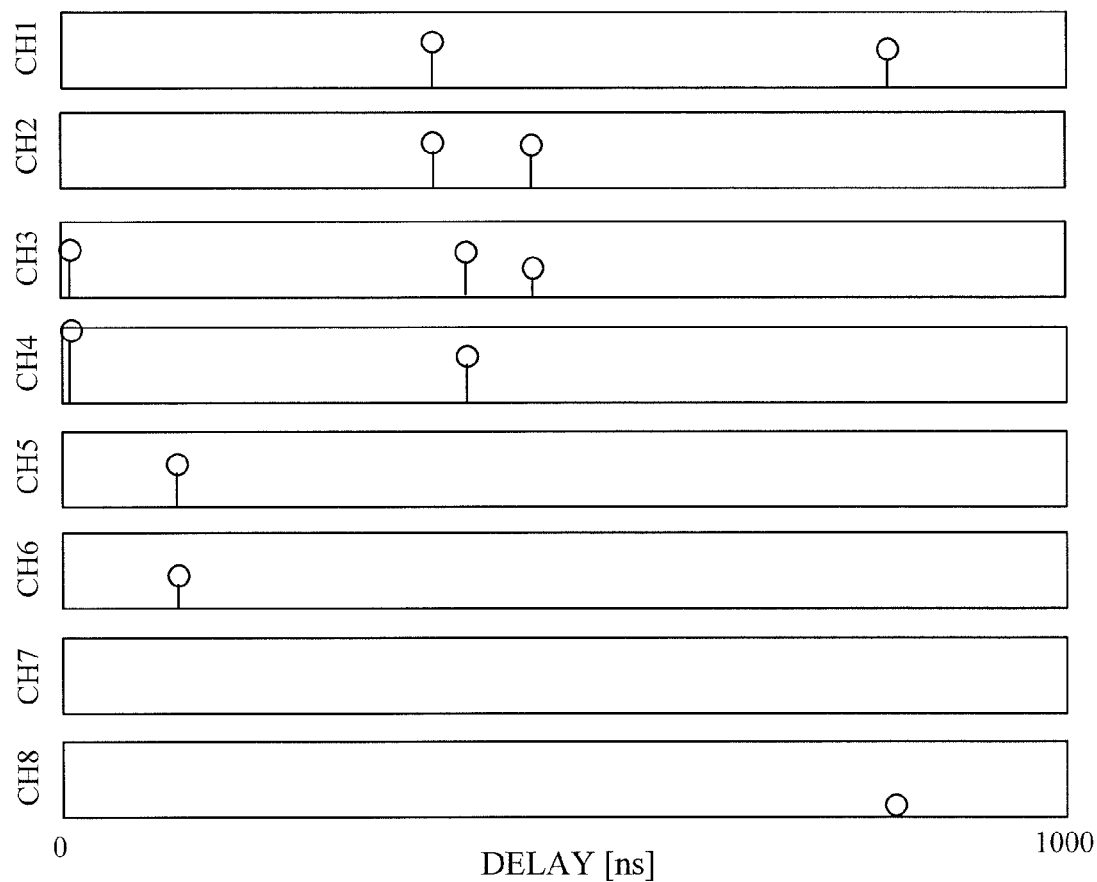
FIG. 16 presents a delay tap mapping of eight channels.

In the radio channel emulation, the channel impulse responses are fed to the emulator and convolved with the transmitted signal. In the conventional emulation, the impulse responses of different MIMO channels (Tx/Rx antenna pairs) have equal power delay profiles and numbers of taps. The modelling for the OTA environment is different. The channel impulse responses may be disassembled and reassembled for different OTA antenna elements on the basis of AoA information of clusters (taps). The original PDP (Power Delay Profile) of six clusters 1500, 1502, 1504, 1506, 1508 and 1510 of an example realisation of SCM model is illustrated in FIG. 15. The delay tap mapping of eight channels in the OTA emulation case is depicted in FIG. 16. There are six clusters, each having a different delay.

In addition to mapping of taps to OTA antennas with power weighting, the original fading signal needs also to be modified by a Doppler shifting. This is necessary to obtain the desired correlation and AoA effects. In each geometric channel model, a moving mobile terminal may be assumed. Terminal motion is described by a velocity vector with a specific direction of a travel angle $\theta_v$.

If the plane wave has direction $\theta_k$ of an antenna element k instead of direction $\phi_n$, eq. (2) may be written as:

$$\upsilon_k = \frac{\|\bar{v}\|\cos(\theta_k - \theta_v)}{\lambda_0}. \quad (20)$$

Now, a Doppler correction term C results for an OTA antenna element k and a cluster n as $$C_{k,n} = \upsilon_k - \upsilon_n. \quad (21)$$

Finally, in addition to the power weighting by a weight $w_{n,k}$, the simulated radio channel $H_{s,n}(t,\tau)$ of the cluster n transmitted by an OTA antenna element k, the simulated radio channel $H_{s,n}(t,\tau)$ be may be Doppler shifted by the Doppler correction term $C_{k,n}$ in the following manner, for example.

$$H_{s,n,k}^{OTA}(t,\tau) = w_{n,k} H_{s,n}(t,\tau)\exp(j2\pi C_{k,n}t), \quad (22)$$

where $H_{s,n}(t,\tau)$ is an initial simulated radio channel based on impulse responses $H_{u,s,n}(t,\tau)$ and $H_{s,n}(t,\tau)$ expressed in equations (1), (3) and (4). The simulated radio channel $H_{s,n,k}^{OTA}(t,\tau)$, in turn, represents a simulated radio channel of an antenna element k which is to be shifted or is already shifted with respect to the antenna elements 402 to 416 and the DUT 400 by using the weights $w_{n,k}$. Additionally, the simulated radio channel $H_{s,n,k}^{OTA}(t,\tau)$ also represents a simulated radio channel of an antenna element k which may have been Doppler shifted by the term $\exp(j2\pi C_{k,n}t)$.

Figure 17:
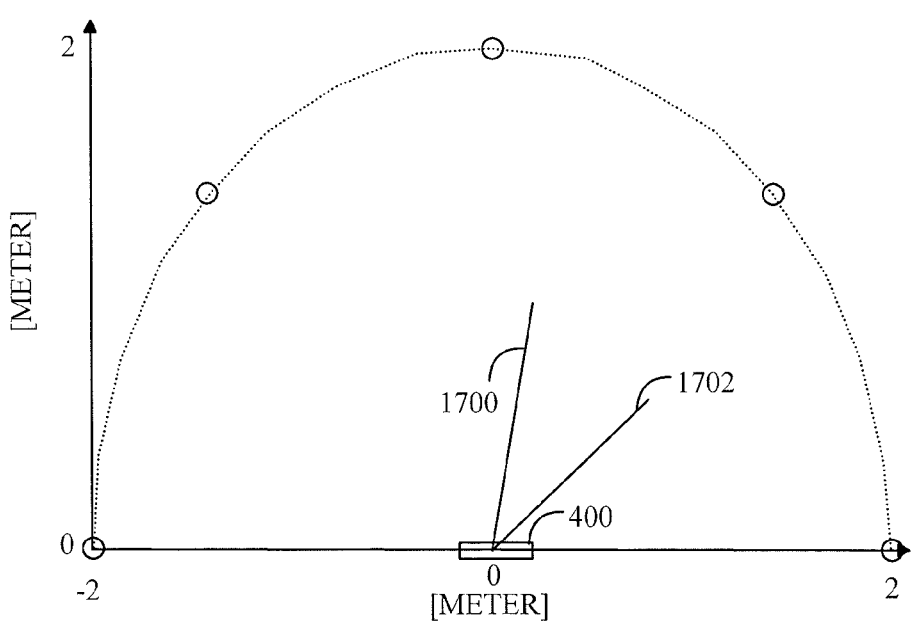
FIG. 17 presents a situation where a DUT spatial resolution is narrower than the spacing of the antenna elements.

Accuracy of the OTA channel modelling may also be taken into account. FIG. 17 presents a situation where a DUT spatial resolution is 24°, the number of OTA antenna elements is 8, and the spacing of the antenna elements is 45°. The OTA antenna elements are marked with circles. A reference number 1700 refers to an AoA vector and a reference number 1702 refers to a velocity vector.

Figure 18:
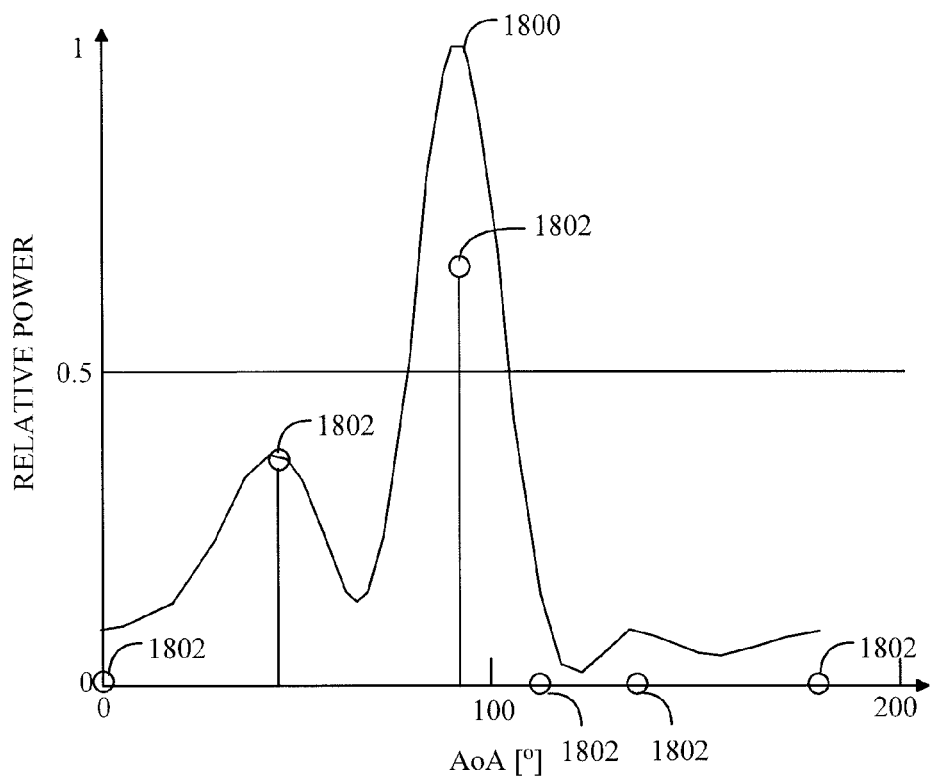
FIG. 18 presents a PAS in the situation of FIG. 17.

FIG. 18 presents a PAS 1800 seen by the receiver in the situation described in FIG. 17. Circles 1802 depict the relative power of the antenna elements. The PAS 1800 has two peaks and that is not desirable.

Figure 19:
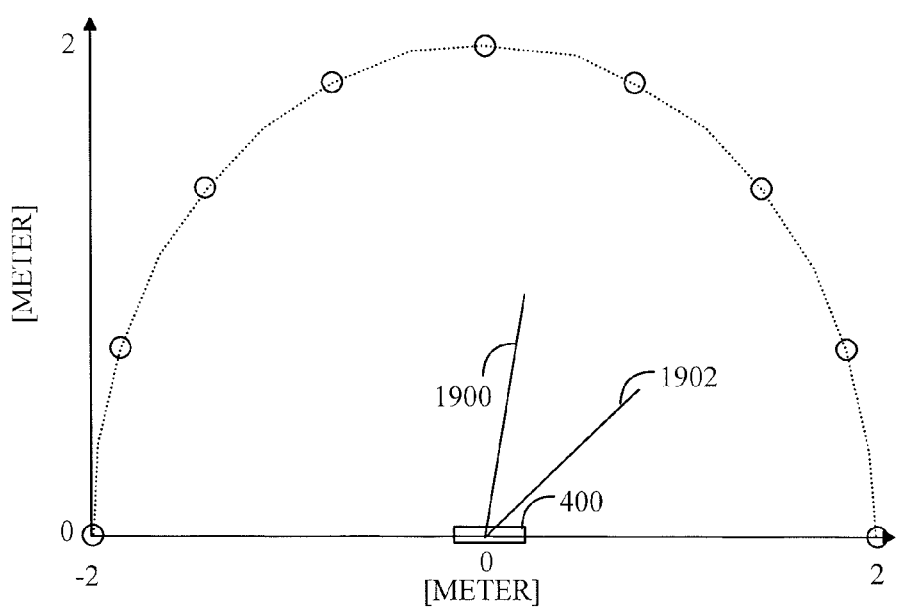
FIG. 19 presents a situation where a DUT spatial resolution is wider than the spacing of the antenna elements.

FIG. 19 presents a situation where a DUT spatial resolution is 24°, the number of OTA antenna elements is 16, and the spacing of the antenna elements is 22.5°. The OTA antenna elements are marked with circles. A reference number 1900 refers to an AoA vector and a reference number 1902 refers to a velocity vector.

Figure 20:
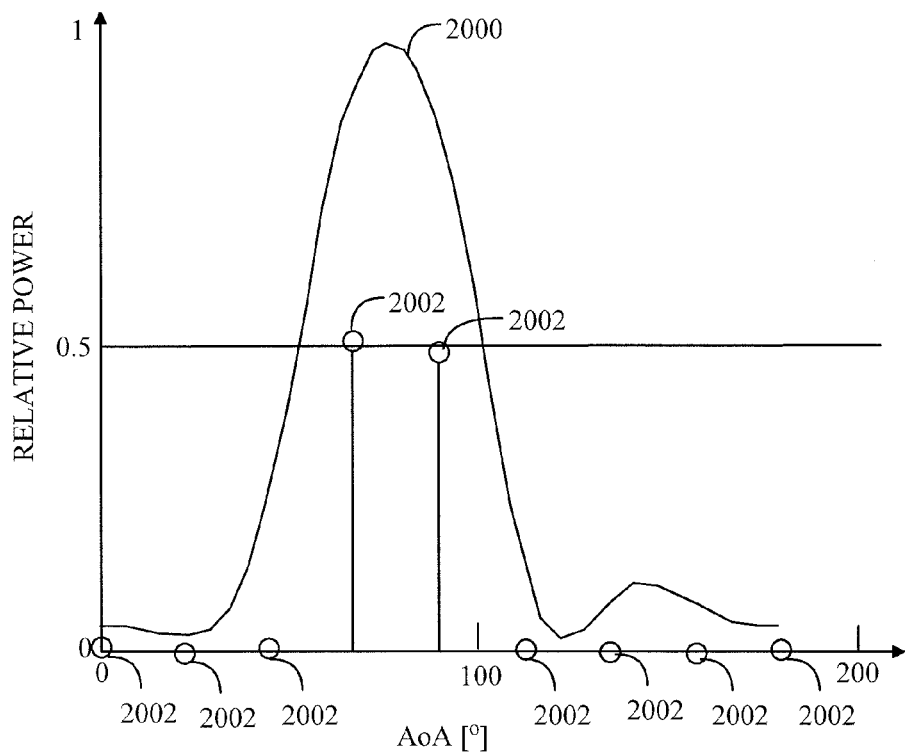
FIG. 20 presents a PAS in the situation of FIG. 19.

FIG. 20 presents a PAS 2000 seen by the receiver in the situation described in FIG. 19. Circles 2002 depict the relative power of the antenna elements. The PAS 2000 has only one peak and that is desirable. The DUT antenna array size determines the spatial resolution. A rule of thumb resolution for $\lambda/2$ ULA is 96°/M, where M is the number of DUT antennas. For example, a two antenna ULA, i.e. M=2, results in a 48° AoA and a 4-antenna ULA results in a 24° AoA. Hence, the spacing between OTA antenna elements is desirably smaller than the spatial resolution of the DUT.

With Laplacian shaped PAS and 35° rms azimuth spread, it is possible to control one wavelength sized arrays with eight antenna elements of an OTA chamber and two wavelength sized arrays with sixteen antenna elements of an OTA chamber.

The number of OTA antennas used for a cluster PAS modelling determines on how large a DUT array size can have accurate correlations. The size of a DUT should be small but the more antenna elements in OTA, the larger dimensions the DUT can have.

Figure 21:
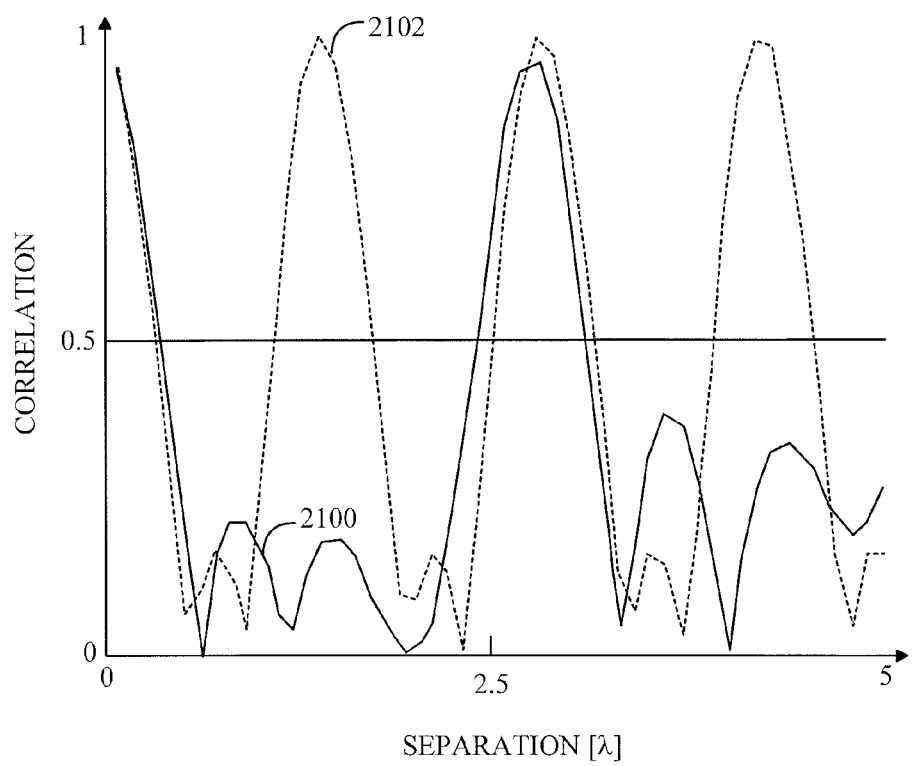
FIG. 21 presents a PAS with three and five antenna elements.

FIG. 21 presents a PAS 2100 with five transmission antenna elements and a PAS 2102 with three transmission antenna elements.

The fading, including Doppler and possible correlation of antenna elements of OTA as well as a channel power delay profile, may be included in the channel coefficients.

Channel coefficients may be generated by a modified version of eq. (18)

$$H_{s,n}(t,\tau) = \sqrt{P_n} \sum_{m=1}^{M} \begin{pmatrix} F_{tx,s}(\phi_{n,m})\exp(jd_sk\sin(\phi_{n,m})) \cdot \\ \exp(j(\Phi + 2\pi\upsilon_{n,m}t))\delta(\tau - \tau_{n,m}) \end{pmatrix} \quad (23)$$

where k is a wavenumber defined as $k=2\pi/\lambda_0$.

If the OTA chamber has dual polarized antenna elements, the channel coefficient formula may be written separately for V and H polarizations:

$$H_{V,s,n}(t,\tau) = \quad (24)$$

$$\sqrt{P_n}\sum_{m=1}^{M}\left(\begin{bmatrix}F_{tx,s}^V(\phi_{n,m})\\F_{tx,s}^H(\phi_{n,m})\end{bmatrix}^T\begin{bmatrix}\exp(j\Phi_{n,m}^{vv}) & \sqrt{\kappa_{n,m}^{-1}}\exp(j\Phi_{n,m}^{vh})\\\sqrt{\kappa_{n,m}^{-1}}\exp(j\Phi_{n,m}^{hv}) & \exp(j\Phi_{n,m}^{hh})\end{bmatrix}\begin{bmatrix}1\\0\end{bmatrix}\right).$$
$$\exp(jd_s k\sin(\phi_{n,m}))\exp(j(2\pi\upsilon_{n,m}t))\delta(\tau-\tau_{n,m})$$

$$H_{H,s,n}(t,\tau) = \quad (25)$$

$$\sqrt{P_n}\sum_{m=1}^{M}\left(\begin{bmatrix}F_{tx,s}^V(\phi_{n,m})\\F_{tx,s}^H(\phi_{n,m})\end{bmatrix}^T\begin{bmatrix}\exp(j\Phi_{n,m}^{vv}) & \sqrt{\kappa_{n,m}^{-1}}\exp(j\Phi_{n,m}^{vh})\\\sqrt{\kappa_{n,m}^{-1}}\exp(j\Phi_{n,m}^{hv}) & \exp(j\Phi_{n,m}^{hh})\end{bmatrix}\begin{bmatrix}0\\1\end{bmatrix}\right).$$
$$\exp(jd_s k\sin(\phi_{n,m}))\exp(j(2\pi\upsilon_{n,m}t))\delta(\tau-\tau_{n,m})$$

Here $F_{tx,s}^V$ and $F_{tx,s}^H$ are field patterns of V (Vertical) and H (Horizontal) polarizations of the antenna elements, respectively. Phase terms $\Phi_{n,m}^{vv}$ etc. are random initial phases $\in [0, 2\pi]$ and $\kappa_{n,m}$ are cross polarization power ratios (XPR).

Note that Doppler frequencies $\upsilon_{n,m}$ are still determined on the basis of AoA angles. The result is a discrete impulse response with matrix coefficients $H_n(t,\tau)$. Dimensions of $H_n(t,\tau)$ are in a single polarized case 1×S and in a dual polarized case 2×S, where S is the number of antenna elements in a base station. This step can be done by a Matlab implementation of a geometric channel model, e.g. SOME or WINNER model.

Next, mapping of the clusters n to proper emulator channels and OTA antenna elements, depending on the cluster nominal direction and the cluster angle spread, may be performed. The selected method may depend on whether accurate AoA (referring to eq. (5)), accurate spatial correlation (referring to eq. (18)) or balanced combination of both (referring to FIG. 14 and its explanation) is emphasized. The methods are described for a single polarized case, but they are also applicable to the dual polarized case. The only difference is that in a dual polarized case V (Vertical) and H (Horizontal) polarized channel impulse responses from eq. (24) and (25) may be mapped separately to V and H polarized OTA antenna elements.

Figure 22:
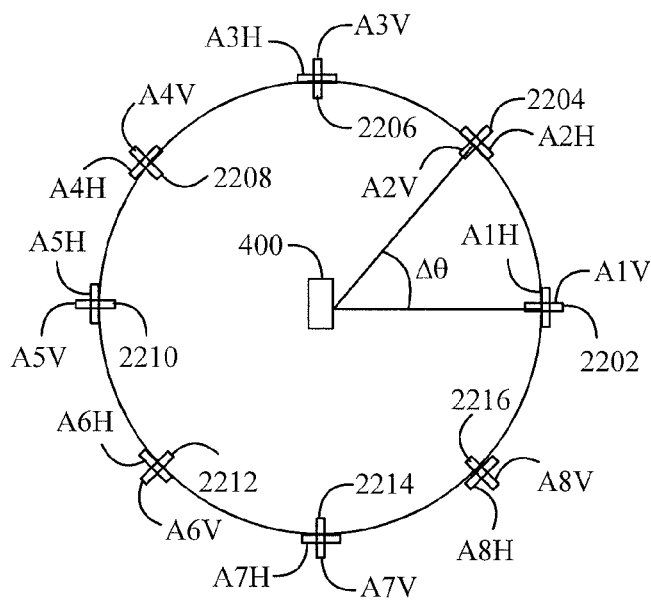
FIG. 22 presents polarizing antenna elements.

FIG. 22 presents an OTA chamber antenna setup with eight uniformly spaced dual polarized chamber antenna elements 2202, 2204, 2206, 2208, 2210, 2212, 2214 and 2216. In FIG. 22, the V-polarized elements are actually orthogonal to the paper (azimuth plane). If dual polarized OTA antenna elements are used like in FIG. 22, an emulator configuration may be with one base station output signal 1×16 SIMO, with two base station output signals 2×16 MIMO etc. For example, antenna A1V denotes the first OTA antenna position and vertically (V) polarized element, A8H denotes the eighth OTA antenna position and horizontally (H) polarized element, etc.

What is explained above refers to the way of forming at least one antenna pattern of the simulated radio channel with the antenna elements in the OTA chamber. Let us now examine how to rotate each antenna pattern around with respect to the DUT and the antenna elements, for example.

Figure 23:
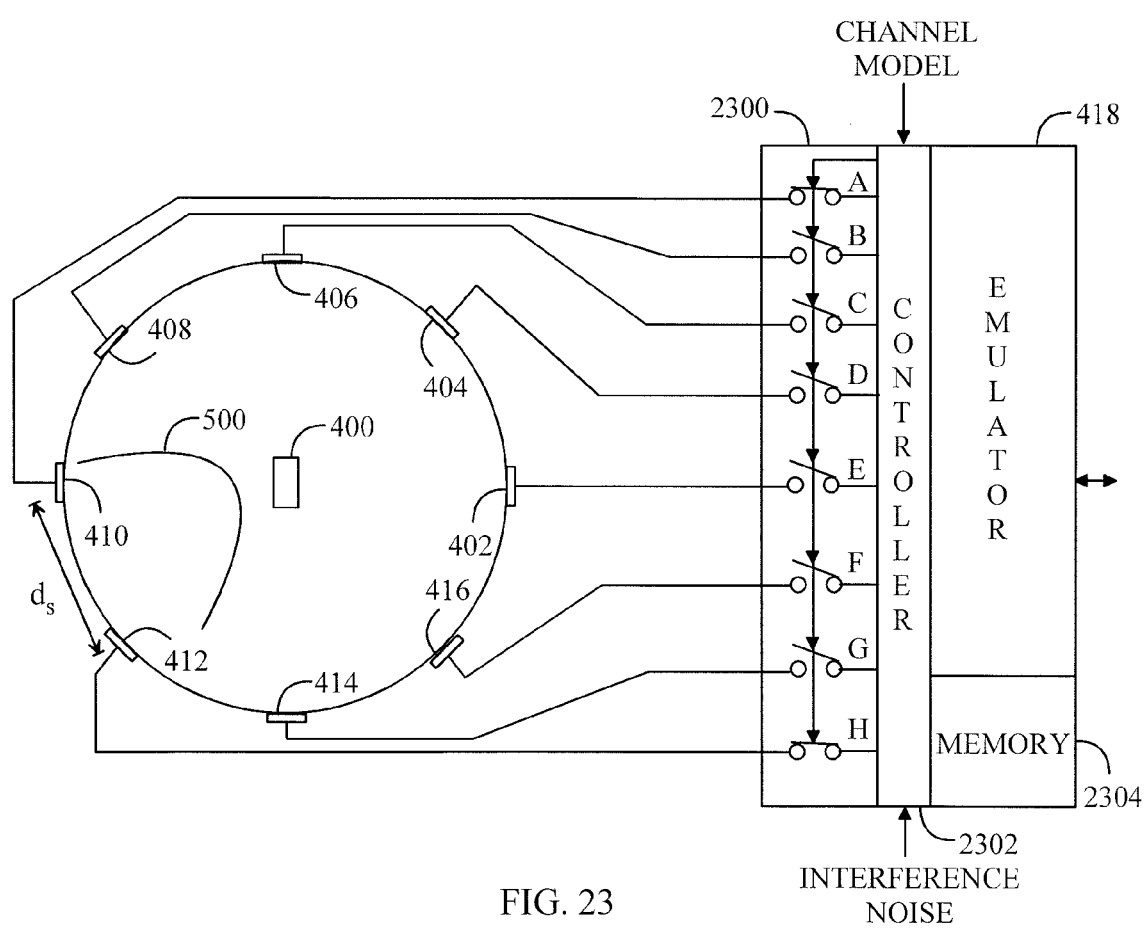
FIG. 23 shows an emulator with switches in one state.
Figure 24:
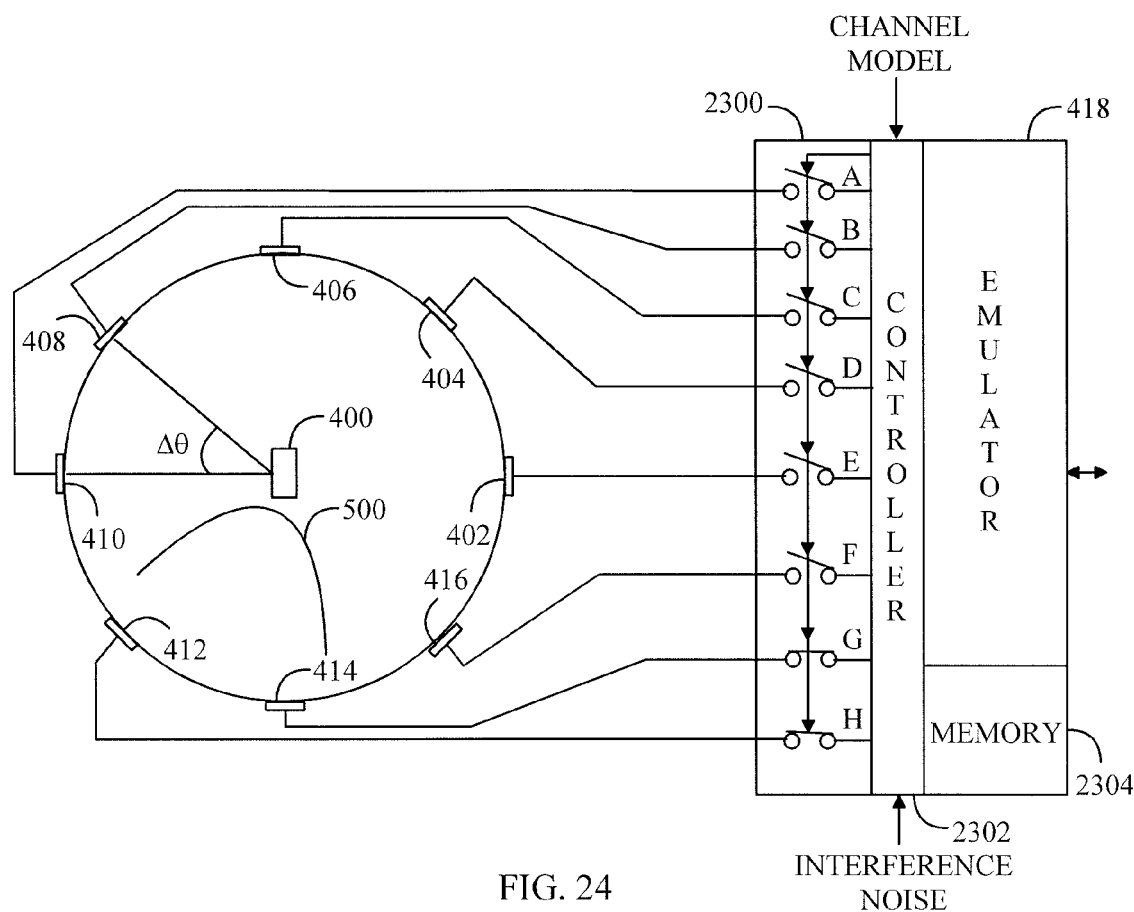
FIG. 24 shows an emulator with switches in another state.

FIGS. 23 and 24 present a shift of the simulated radio channel in a simplified manner. FIG. 23 presents an embodiment where the emulator 418 simulates only one transmitter or receiver, and only one beam 500 is formed. In this example, an emulator 418 has switches 2300, controller 2302 and a memory 2304. An input signal, which represents a signal from a base station, may be fed to the switches 2300. The controller 2302 of the emulator 418 controls the states of the switches 2300 and in that manner it controls the shift of an estimated radio channel. Weighting may include amplification and phase shifting. By controlling the switches 2300 in a proper manner, a beam 500, which is formed by the signals of the simulated radio channel fed to the antenna elements 402 to 416, may be rotated electronically around the DUT 500 and along the circumference of the antenna elements 402 to 416. In the example of FIG. 23, switches A and H have been switched closed in order to provide the antenna elements 410 and 412 with an RF signal, and switches B to G have been switched open in order not to take actively part in beam forming at one moment of communication. The RF signals fed to the antenna elements 410 and 412 may interfere with each other such that they form a beam 500 directed to the DUT 400. The beam 500 may be a reception beam or a transmission beam.

FIG. 24 presents the emulator 418 and the switches 2300 at another moment, which may be the very next moment with respect to the moment presented in FIG. 23 in a temporal sequence of moments of communication. In FIG. 23, the closed switches, which determine the antenna pattern, are switches A and G. The closed switches in FIG. 24 are switches G and H due to the rotation by one increment. The change in the states of the switches A to H between the moments in FIG. 23 and FIG. 24 may shift the simulated radio channel geometrically with respect to the antenna elements 402 to 416. The change in the states of the switches A to H between the moments in FIG. 23 and FIG. 24 also results in a shift of the beam 500 by a discrete step which corresponds to the distance $d_s$ between two antenna elements 402 to 416. Hence, the direction 2400 of the beam 500 rotates in a discrete manner by an angle $\Delta\alpha$, which is the same as the angle $\Delta\theta$ of two antenna elements 402 to 416. The rotation of the beam 500 by the angle $\Delta\alpha$ may take place so many times that the beam 500 rotates fully around the DUT 400 at least once.

An open switch corresponds to weighting an RF signal to or from an antenna element 402 to 416 by zero. A closed switch, in turn, corresponds to weighting an RF signal to or from the antenna element 402 to 416 by the actual weight. Hence, switches A to H may not be needed at all but each switch A to H may be replaced by a multiplier multiplying the RF signals with the actual weights. The controller 2302 may then shift weights from one antenna element to a next antenna element 402 to 416 as a function of time in order to perform the test of the DUT 400 with one antenna pattern from more than one direction. That is, the simulated radio channel may be set to a new position with respect to the antenna elements 400 to 416 by shifting each weight from one antenna element to another antenna element.

Figure 25:
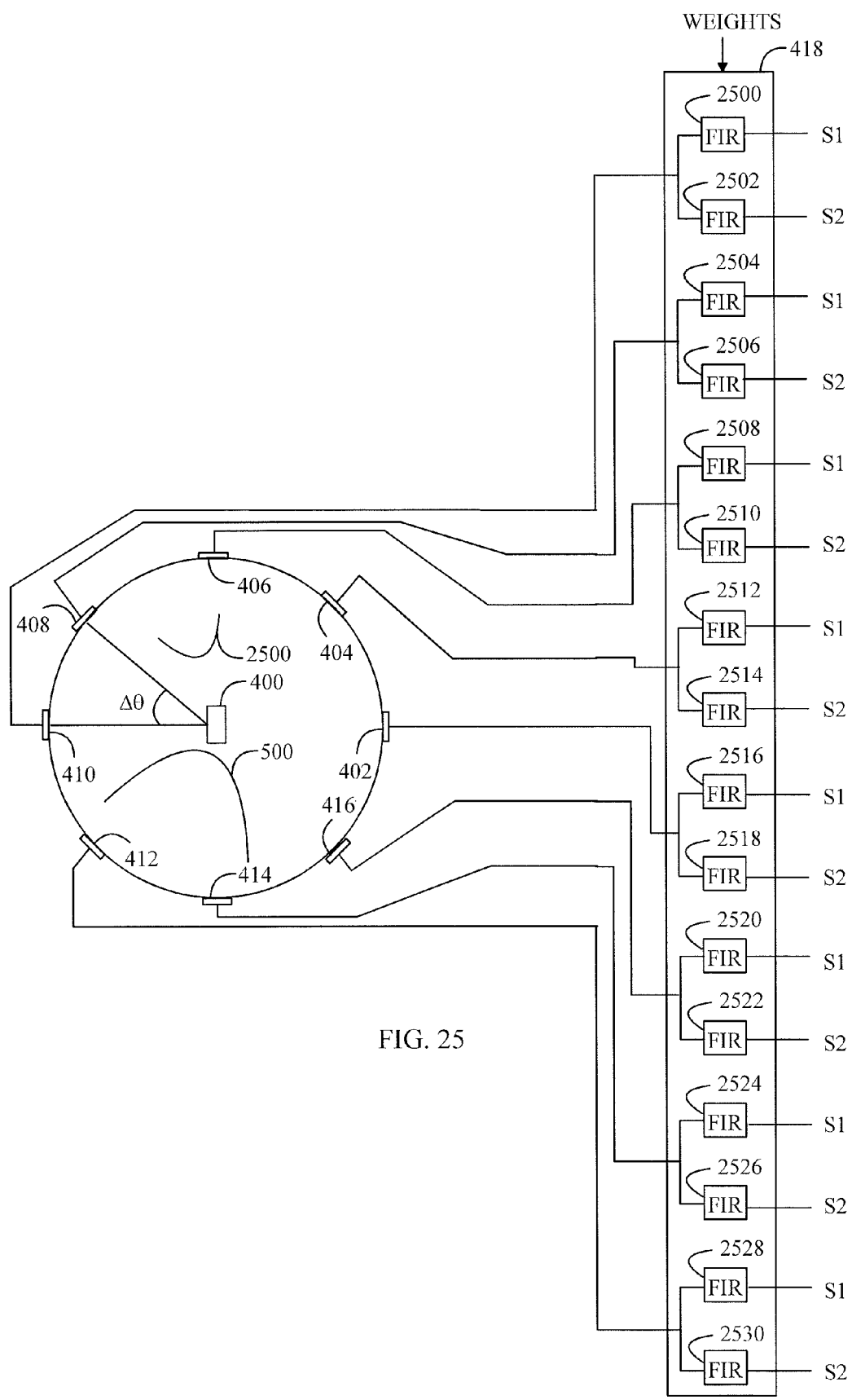
FIG. 25 shows an emulator with FIR filters.

FIG. 25 presents an embodiment where the emulator 418 simulates two transmitters or receivers. A first signal S1 and a second signal S2 may be fed to the emulator 418, the signals S1 and S2 being signals of two different base stations, for example. Instead, the emulator may output the signals S1 and S2, the signals then being received by two different base stations, for example. When transmitting towards the DUT 400, each of the signals S1 and S2 is fed to an FIR filter 2500 to 2530, which distorts the signal according to a channel model. When receiving from the DUT 400, each of the signals S1 and S2 is received from an FIR filter 2500 to 2530 which has distorted the signal according to the channel model. In general, the number of signals S1, S2 could be more than two. Signals S1, S2 of different base stations may be fed to separate FIR filters for distorting the signals in a unique manner. The shift of at least one beam 500 with respect of the antenna elements 402 to 416 can be performed by changing the weight coefficients in the FIR filters 2500 to 2530, for example.

Figure 26:
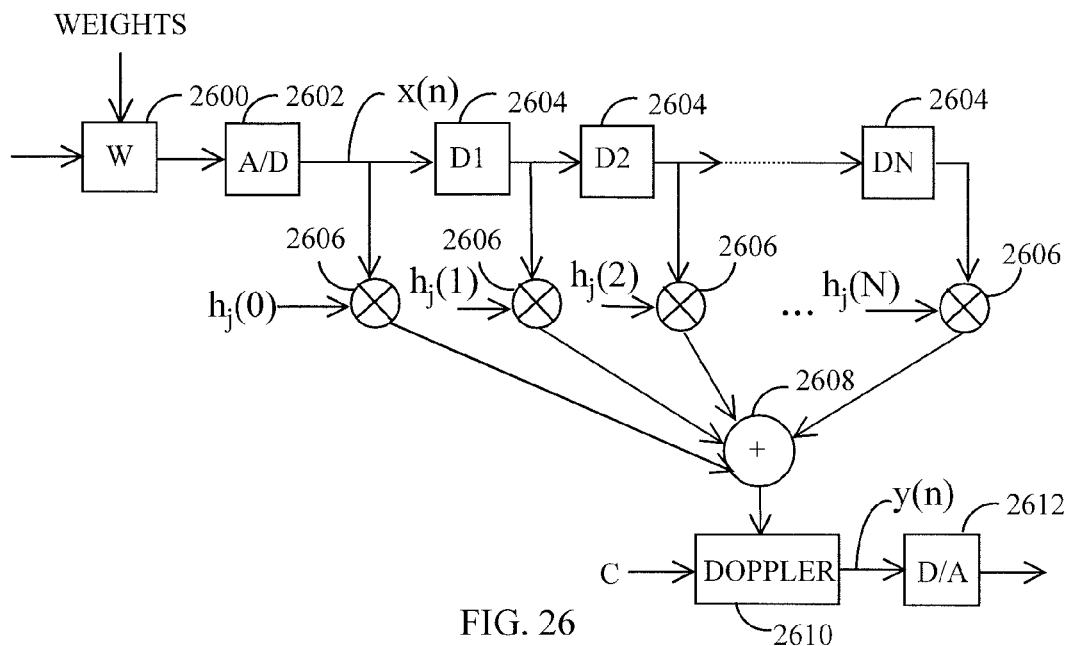
FIG. 26 shows a FIR filter.

FIG. 26 shows a block diagram of a FIR filter which may comprise an analog-to-digital converter 2600, a weighting element 2602, delay elements 2604 arranged as a shift register, a multiplier 2606, a summer 2608, a Doppler element 2610 and a digital-to-analog converter 2612. The analog-to-digital converter 2600 receives an analog signal S1 or S2. The basic function of an FIR filter without the weighting element 2602 and the Doppler element 2610 is as follows. The digital input signal x(n) from an analog-to-digital converter 2600 is delayed in each delay element 2604, whose delays may have the same or different length in time, and the delayed signals are multiplied in the multipliers 2606 by the desired channel coefficient $h_j(i)$, where $i=[0, \ldots, N]$ and $j=[1, \ldots, K]$ refers to a FIR filter 2500 to 2530 in FIG. 25. A channel model is defined by the channel coefficients $h_j=[h(0), \ldots, h(N)]$, which are also called the channel estimates of the radio channel or tap coefficients of a FIR filter. The signal components are summed in a summer 2608 and the summed signal is converted to an analog form in the digital-to-analog converter 2612.

In an embodiment, each FIR filter 2500 to 2530 may comprise a weighting element 2602. The weighting element(s) 2602 may be placed anywhere between the analog-to-digital converter 2600 and the digital-to-analog converter 2612 as long as all delayed signal components are weighted before or after delay. The weighting element 2602 may be a multiplier which multiplies the simulated radio channel $H_{n,k}$ with a weight $w_{n,k}$ in order to provide a product $w_{n,k}H_{n,k}$.

In an embodiment, each FIR filter may additionally comprise a Doppler element 2610. The Doppler element may be a multiplier which multiplies the weighted radio channel $w_{n,k}H_{n,k}$ with a Doppler shift $\exp(j2\pi C_{n,k}t)$ in order to provide a product $w_{n,k}H_{n,k}\exp(j2\pi C_{n,k}t)$. The Doppler element(s) 2610 may be placed anywhere between the analog-to-digital converter 2600 and the digital-to-analog converter 2612 as long as all delayed signal components are Doppler shifted before or after delay.

The weight coefficients w may be computed using equations (2), (6), (8) and (19), and the channel signal output by the summer 2608 may be multiplied by a weight $w_{n,k}$. However, a weight may also be combined with the channel coefficients such that the delayed signals are multiplied by a product $w_{n,k}h_j$ in a FIR filter. Similarly, the Doppler shift $\exp(j2\pi C_{n,k}t)$ may be combined with the multiplication in multipliers 2606 in order to form $w_{n,k}h_j\exp(j2\pi C_{n,k}t)$. When terms $w_{n,k}h_j\exp(j2\pi C_{n,k}t)$ are summed together they result in the desired output $w_{n,k}H_{n,k}\exp(j2\pi C_{n,k}t)$. The weights $w_{n,k}$ in a FIR filter 2500 to 2532 are changed such that the at least one beam 500 can be made to shift around the DUT 400. The rotation of the simulated radio channel may be included in the computation of weights by varying the angle $\phi_{n,m}$, $\phi_0$ or $\phi_n$ in the optimization with equation (2), (6), (8) or (19). The weight coefficients $H=[h_1, \ldots, h_K]$, in turn, may be changed in a similar manner to how the characteristics of a real radio channel have been measured to change.

Generally, radio channel coefficients h may be real or complex. Complex channel coefficients are often needed since a simulator may use quadrature modulation, wherein a signal is divided into two parts. The real signal part I (Inphase) is multiplied by a carrier without phase shift and the imaginary signal part Q (Quadrature) is multiplied by a phase shifted carrier. Thus, signal x can be expressed in the form x=I+jQ, where I is the real signal part, Q is the imaginary signal part and j is an imaginary unit.

In mathematical form, the output signal y(n) of a FIR filter can be expressed as convolution of the sum of the product of the delayed signal and the channel coefficients:

$$y(n) = x^* h = \sum_{k=1}^{N} h(k)x(n-k) \qquad (26)$$

where * denotes a convolution operation and n denotes the index of a signal element. Signals x and y and a channel impulse response estimate h can be processed in scalar form, in vector form or in matrix form.

Figure 27:
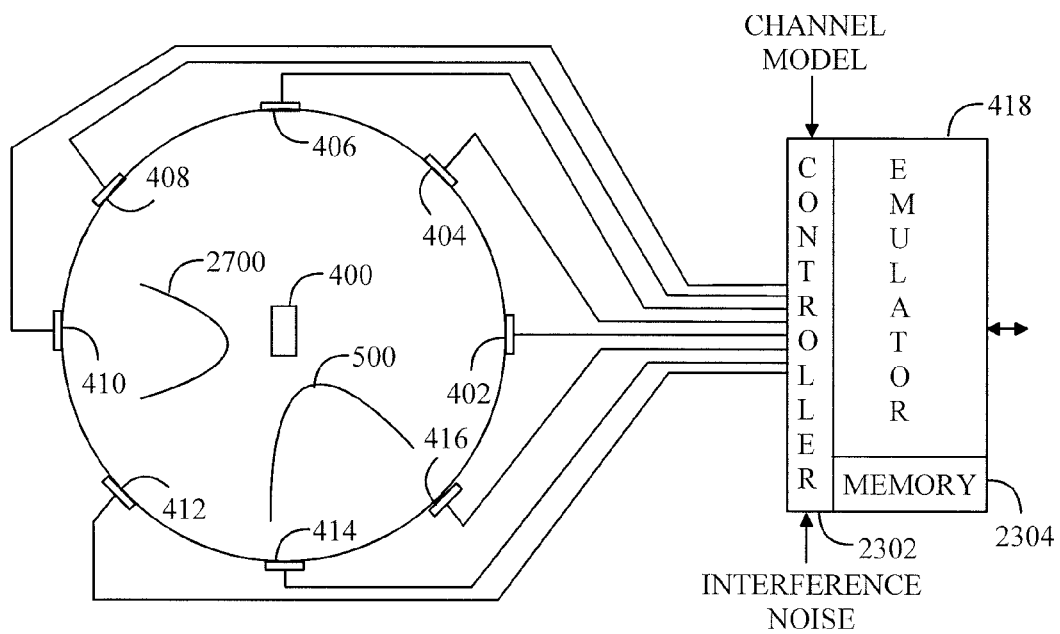
FIG. 27 shows an OTA chamber with two beams in one position.

FIG. 27 presents a moment of communication where there are two beams 500, 2700 in the antenna pattern of the antenna elements 402 to 416. The beams 500, 2700 represent an antenna pattern of the simulated radio channel. It is assumed in this example that the beam 2700 is formed by the antenna element 410, and the beam 500 is formed by the antenna elements 414 and 416 at a first moment.

Figure 28:
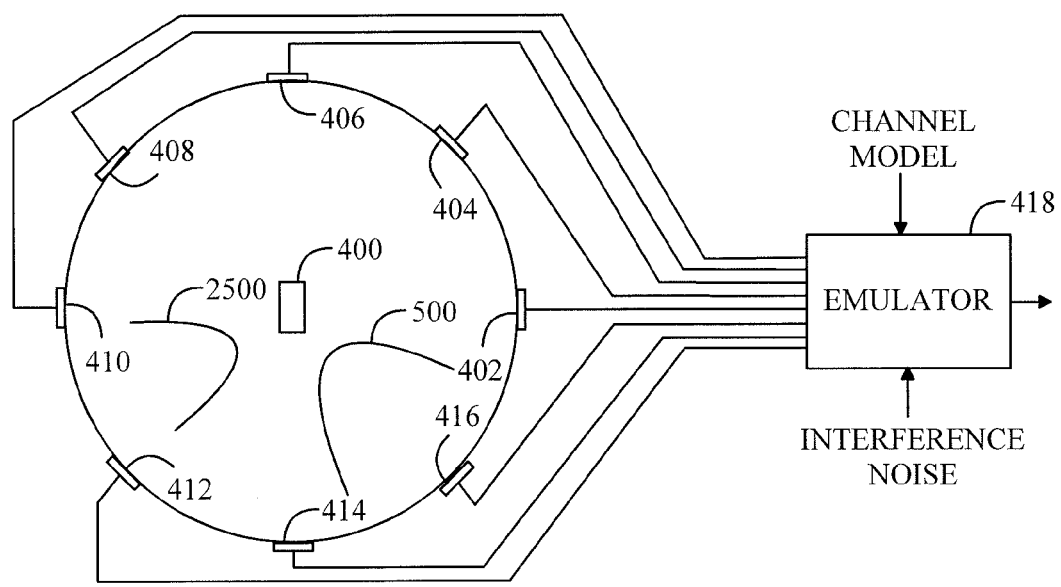
FIG. 28 shows an OTA chamber with two beams shifted to another position.

FIG. 28 presents the very next moment of communication with respect to the moment in FIG. 25. The same beams 500, 2700 have been rotated to the next position with respect to the DUT 400 and the antenna elements 402 to 416 by the emulator 418. The movement of the beams represents the shift of the angular spectrum of the simulated radio channel. That means that the simulated radio channel as such has not changed but it has rotated with respect to the DUT 400 and the antenna elements 402 to 416. It should also be understood that the antenna pattern or the power angular spectrum can be shifted with respect to the antenna elements 402 to 416. The beam 2500 resides now between the antenna elements 410 and 412 and may be formed by them. The beam 500 has also moved by the same amount in the same direction. Instead of shifting each beam 500, 2700 by an increment of the angle $\Delta\theta$ of two antenna elements 402 to 416, the emulator 418 may shift each beam 500, 2500 by less or more than the angle $\Delta\theta$. When the estimated radio channel is changed to a new one having a new cluster with new paths, the new estimated radio channel is shifted in a similar manner with respect to the antenna elements 402 to 416 and the DUT 400.

In general, the emulator 418 may shift a simulated radio channel with respect to the plurality of antenna elements 402 to 416 for directing each beam 500, 2700 from different directions towards the DUT 400 in an anechoic chamber at different moments of communication. In this example, the simulated radio channel may be set to a new position with respect to the antenna elements 400 to 416 by shifting each beam by a predetermined amount with respect to the antenna elements 402 to 416 and hence with respect to the DUT 400. The number of settings and shiftings may be more than one. The order at which each beam is directed towards the DUT 400 may not need to be temporal.

The emulator 418 may form the weights of the antenna elements at each moment separately. Alternatively the emulator 418 may have a memory 2304 where the weights have been stored beforehand, and the controller 2302 of the emulator 418 may retrieve new weights from the memory 2304 at every moment for shifting the radio channel with respect to the antenna elements 402 to 416 during the communication between the emulator 418 and the DUT 400. Desired weights may be computed in the emulator 418 or in some other computer beforehand and stored in the memory 2304.

The weights may be computed using equations (2), (6), (8) and (19). The rotation of the simulated radio channel may be included in the computation of weights by varying the angle $\phi_{n,m}$, $\phi_0$ or $\phi_n$ in the optimization with equation (2), (6), (8) or (19). The angle $\phi_{n,m}$, $\phi_0$ or $\phi_n$ may be incremented, for instance, by 20° in order to calculate weights for a new direction of each antenna pattern of the simulated radio channel. Assume now that an antenna pattern of a simulated radio channel has four beams which have initial angles of arrival at 10°, 130°, 256° and 300°. Table 2 illustrates their rotation in increments of 20° once round the DUT 400.

TABLE 2

Rotation of beams of the simulated radio channel.

| Initial angle [°] | 1st shift [°] | 2nd shift [°] | 3rd shift [°] | ... | 14th shift [°] |
|---|---|---|---|---|---|
| 10 | 30 | 50 | 70 | ... | 350 |
| 130 | 150 | 170 | 190 | ... | 110 |
| 256 | 276 | 296 | 316 | ... | 236 |
| 300 | 320 | 340 | 360 | ... | 280 |

As to FIG. 23, the memory 2304 may have data for the control of the state of the switches A to H for each moment of communication. During communication between the emulator 418 and the DUT 400, the controller 2302 of the emulator 418 may retrieve the data from the memory to set the switches A to H to a desired state at different moments so as to rotate the simulated radio channel. Desired data may be computed beforehand and stored in the memory 2304.

Figure 29:
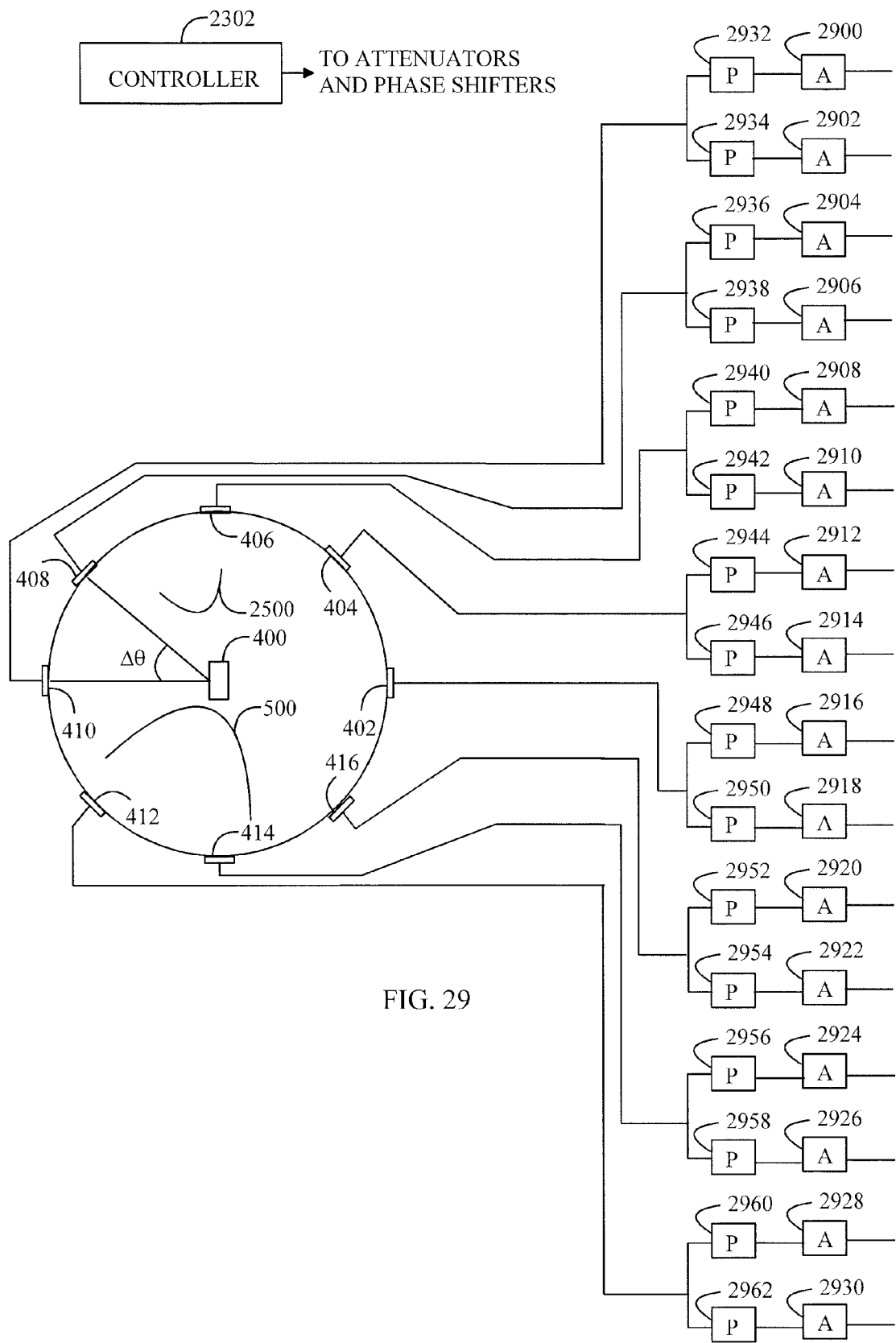
FIG. 29 shows an emulator with attenuators and phase shifters.

FIG. 29 presents an embodiment where a signal has been distributed to antenna elements 402 to 416 through attenuators 2900 to 2930 and phase shifters 2932 to 2962. A simulated radio channel may be formed and rotated by receiving suitable weight commands from the controller 2302 in the attenuators 2900 to 2930 and by receiving suitable weight commands from the controller 2302 in the phase shifters 2932 to 2962. The weight commands for the attenuators 2900 to 2930, which may be amplifiers, may increase or decrease the amplification of the attenuator. The weight commands for the phase shifters 2932 to 2962 may advance or retard the phase of the RF-signal in the phase shifter. A phase shifter may be a component having a controllable delay. The operation of an analog phase shifter may be based on a non-linear phenomenon. An analog phase shifter may change capacitance as function of control voltage and may be a varactor diode, for instance. Digitally the attenuation and phase shifting may be performed using one or two multipliers and complex weights where a real part determines the attenuation (amplification) and the imaginary part determines the phase shift. The signals to the antenna elements 402 to 416 may be phase shifted and attenuated using variable weights such that they form and shift each estimated radio channel for the DUT 400.

In an emulator based on sum-of-sinusoids, RF signals for antenna elements 402 to 4016 may be formed in attenuators 2900 to 2930 and phase shifters 2932 to 2962, and RF signals may be transmitted or received through at least two antenna elements 402 to 416 in order to form a desired antenna pattern and to shift the antenna pattern with respect to the antenna elements 402 to 416. The antenna elements 402 to 416 form at least one beam 500, 2500 for the DUT 400. This kind of communication provides fading in the air at the DUT 400 due to interference. All antenna elements 402-416 may be active in forming the at least one beam. It is also possible that only a fraction of the antenna elements 402 to 416 are active. A prior art solution of a sum-of-sinusoid simulator is described in Pätzold, M. et. al. "A study of Stochastic and Deterministic Procedures for the Design of Simulation Models for Spatial Channels", pp. 1924 to 1931, Proc. 13$^{th}$ IEEE Int. Symp. on Personal, Indoor and Mobile Radio Communications, IEEE PIMRC 2002, Lisbon, Portugal, 15 to 18 Sep. 2002. The solution lacks an electrically realized shift of the simulated radio channel with respect to the DUT 400.

Above, the shifting of the simulated radio channel has been described two-dimensionally. In an embodiment, the shifting of the simulated radio channel may, however, be performed three-dimensionally, utilizing antenna elements which have not been placed on a plane in the OTA chamber. The direction of the angular spectrum having at least one beam is then determined in solid angles.

In an embodiment, the DUT 400 may experience that it receives a signal from the antenna elements 402 to 416 in at least one beam which is associated with a reflection and/or scattering from at least one corresponding cluster. Alternatively, the antenna elements 402 to 416 may experience that they receive a signal from the DUT 400 in at least one beam which is associated with a reflection and/or scattering from at least one corresponding cluster. The power angular spectrum shifts with respect to the DUT 400 while the physical relationship of the antenna elements 402 to 416 and the DUT 400 remains unchanged.

Figure 30:
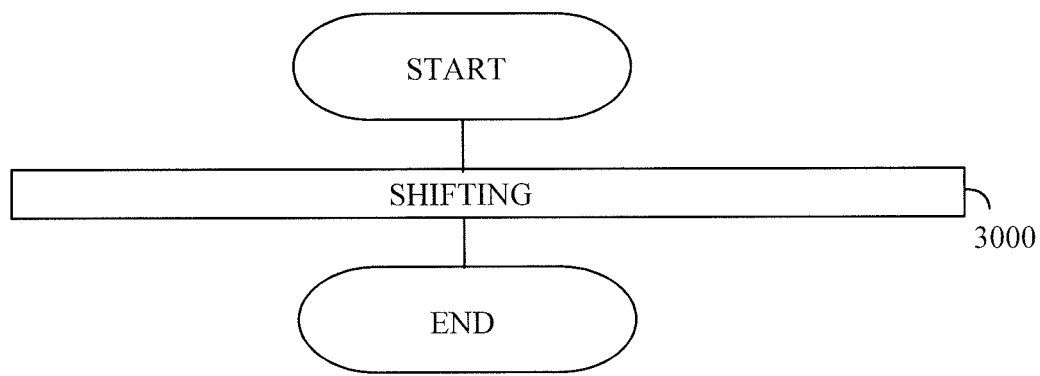
FIG. 30 shows a flow chart of the method.

FIG. 30 presents a flow chart of the method of communicating with an electronic device under test through a simulated radio channel of an emulator. In step 3000, shifting a simulated radio channel with respect to a plurality of antenna elements coupled with the emulator for communicating with the device under test using different directions for the simulated radio channel in an anechoic chamber.

The embodiments may be implemented, for instance, with ASIC or VLSI circuits (Application Specific Integrated Circuit, Very Large Scale Integration). Alternatively or additionally, the embodiments of method steps may be implemented as a computer program comprising instructions for executing a computer process for communicating with an electronic device under test through a simulated radio channel of an emulator. The emulator may control, on the basis of the electronic circuits and/or the computer program, the use of the antenna elements, the formation of beams and the at least one shift of each beam in the anechoic chamber.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A method of communicating with an electronic device under test through a simulated radio channel of an emulator, the method comprising:

minimizing a cost function of a theoretical spatial cross correlation and a spatial correlation obtained with antenna elements to determine weights associated with the antenna elements, the cost function being minimized with respect to at least one of gain factors associated with the antenna elements and the weights associated with the antenna elements, thereby enabling the simulated radio channel to be electronically rotated around the device under test without moving the antenna elements;

forming, on the basis of the weights, at least one beam of a simulated radio channel with at least two antenna elements; and shifting the simulated radio channel with respect to a plurality of the antenna elements coupled with the emulator to communicate with the device under test by using different directions for the simulated radio channel in an anechoic chamber.

2. The method of claim 1 further comprising shifting the simulated radio channel by directing at least one beam of at least one antenna element at different directions towards the device under test.

3. The method of claim 1 further comprising shifting the power angular spectrum of the simulated radio channel by less or more than a distance between two antenna elements for changing the direction of a beam by less or more than an angle of the two antenna elements with respect to the electronic device between two successive moments of communication.

4. The method of claim 1 further comprising shifting the power angular spectrum of the simulated radio channel by a distance between two antenna elements for changing the direction of a beam by an angle of the two antenna elements with respect to the electronic device at two successive moments of communication.

5. The method of claim 1, further comprising:

feeding the simulated radio channel to the plurality of antenna elements for forming at least one beam of a signal of at least one path with at least one antenna element at a first moment;

setting the simulated radio channel to a new position with respect to the plurality of antenna elements; and feeding the radio channel which has been set to a new position to the plurality of antenna elements for forming the at least one beam with at least one antenna element of a plurality of antenna elements at a second moment.

6. The method of claim 1, wherein the cost function is represented by the following equation $$E_\rho(g_1, g_2, \ldots, g_K) = \sqrt{\frac{1}{M}\sum_{m=1}^{M}|\rho(\Delta_m, \varphi_0, \sigma_\varphi) - \tilde{\rho}(\Delta_m)|^2}, \quad (8)$$

where $\rho(\Delta_m, \phi_0, \sigma_\phi)$ represents a theoretical spatial cross correlation of antenna element spacing $\Delta_m$ of the antenna elements, $\phi_0$ represents a nominal angle-of-arrival, $\sigma_\phi$ represents an angular spread, $\tilde{\rho}(\Delta_m)$ represents a spatial cross correlation, $\Delta_m$ represents $d_s/\lambda_0$ where $d_s$ is a distance between antenna elements in meters and $\lambda_0$ is a wavelength of electromagnetic radiation of a radio signal, the theoretical spatial cross correlation for Laplacian shaped PAS (Power Angular Spectrum) being represented by the following equation $$\rho(\Delta_m, \varphi_0, \sigma_\varphi) = \int \exp(-j2\pi\Delta_m\sin(\varphi_0 + \varphi))\frac{1}{\sqrt{2}\,\sigma_\varphi}\exp\left(\frac{\sqrt{2}\,|\varphi|}{\sigma_\varphi}\right)d\varphi. \quad (11)$$

7. A testing system to test communication with an electronic device under test through a simulated radio channel of an emulator, the testing system being configured to perform operations comprising:

minimizing a cost function of a theoretical spatial cross correlation and a spatial correlation obtained with antenna elements to determine weights associated with the antenna elements, the cost function being minimized with respect to at least one of gain factors associated with the antenna elements and the weights associated with the antenna elements, thereby enabling the simulated radio channel to be electronically rotated around the device under test without moving the antenna elements;

forming, on the basis of the weights, at least one beam of a simulated radio channel with at least two antenna elements; and shifting the simulated radio channel with respect to the plurality of the antenna elements coupled with the emulator to communicate with the device under test by using different directions for the simulated radio channel in an anechoic chamber.

8. The testing system of claim 7, wherein the testing system is configured to direct at least one beam of at least one antenna element at different directions towards the device under test.

9. The testing system of claim 7, wherein the testing system is configured to shift the power angular spectrum of the simulated radio channel by less or more than a distance between two antenna elements for changing the direction of a beam by less or more than an angle of the two antenna elements with respect to the electronic device between two successive moments of communication.

10. The testing system of claim 7, wherein the testing system is configured to shift the power angular spectrum of the simulated radio channel by a distance between two antenna elements for changing the direction of a beam by an angle of the two antenna elements with respect to the electronic device at two successive moments of communication.

11. The testing system of claim 7, wherein the testing system is configured to perform operations comprising:

feeding the simulated radio channel to the plurality of antenna elements coupled to an emulator for forming at least one beam of a signal of at least one path with at least one antenna element at a first moment;

setting the simulated radio channel to a new position with respect to the plurality of antenna elements; and feeding the radio channel which has been set to a new position to the plurality of antenna elements for forming the at least one beam with at least one antenna element of a plurality of antenna elements at a second moment.

12. The testing system of claim 7, wherein the cost function is represented by the following equation $$E_\rho(g_1, g_2, \ldots, g_K) = \sqrt{\frac{1}{M}\sum_{m=1}^{M}|\rho(\Delta_m, \varphi_0, \sigma_\varphi) - \tilde{\rho}(\Delta_m)|^2}, \quad (8)$$

where $\rho(\Delta_m, \phi_0, \sigma_\phi)$ represents a theoretical spatial cross correlation of antenna element spacing $\Delta_m$ of the antenna elements, $\phi_0$ represents a nominal angle-of-arrival, $\sigma_\phi$ represents an angular spread, $\tilde{\rho}(\Delta_m)$ represents a spatial cross correlation, $\Delta_m$ represents $d_s/\lambda_0$ where $d_s$ is a distance between antenna elements in meters and $\lambda_0$ is a wavelength of electromagnetic radiation of a radio signal, the theoretical spatial cross correlation for Laplacian shaped PAS (Power Angular Spectrum) being represented by the following equation $$\rho(\Delta_m, \varphi_0, \sigma_\varphi) = \int \exp(-j2\pi\Delta_m \sin(\varphi_0 + \varphi)) \frac{1}{\sqrt{2}\,\sigma_\varphi} \exp\left(\frac{\sqrt{2}\,|\varphi|}{\sigma_\varphi}\right) d\varphi. \quad (11)$$

13. An emulator to communicate with an electronic device under test through a simulated radio channel, the emulator being configured to perform operations comprising:

minimizing a cost function of a theoretical spatial cross correlation and a spatial correlation obtained with antenna elements to determine weights of associated with the antenna elements, the cost function being minimized with respect to at least one of gain factors associated with the antenna elements and the weights associated with the antenna elements, thereby enabling the simulated radio channel to be electronically rotated around the device under test without moving the antenna elements;

forming, on the basis of the weights, at least one beam of a simulated radio channel with at least two antenna elements; and shifting the simulated radio channel with respect to the plurality of the antenna elements coupled with the emulator to communicate with the device under test by using different directions for the simulated radio channel in an anechoic chamber.

14. The emulator of claim 13, wherein the cost function is represented by the following equation $$E_\rho(g_1, g_2, \ldots, g_K) = \sqrt{\frac{1}{M}\sum_{m=1}^{M}|\rho(\Delta_m, \varphi_0, \sigma_\varphi) - \tilde{\rho}(\Delta_m)|^2}, \quad (8)$$

where $\rho(\Delta_m, \phi_0, \sigma_\phi)$ represents a theoretical spatial cross correlation of antenna element spacing $\Delta_m$ of the antenna elements, $\phi_0$ represents a nominal angle-of-arrival, $\sigma_\phi$ represents an angular spread, $\tilde{\rho}(\Delta_m)$ represents a spatial cross correlation, $\Delta_m$ represents $d_s/\lambda_0$ where $d_s$ is a distance between antenna elements in meters and $\lambda_0$ is a wavelength of electromagnetic radiation of a radio signal, the theoretical spatial cross correlation for Laplacian shaped PAS (Power Angular Spectrum) being represented by the following equation $$\rho(\Delta_m, \varphi_0, \sigma_\varphi) = \int \exp(-j2\pi\Delta_m \sin(\varphi_0 + \varphi)) \frac{1}{\sqrt{2}\,\sigma_\varphi} \exp\left(\frac{\sqrt{2}\,|\varphi|}{\sigma_\varphi}\right) d\varphi. \quad (11)$$

* * * * *